US011748759B1

(12) United States Patent
Sardari et al.

(10) Patent No.: US 11,748,759 B1
(45) Date of Patent: Sep. 5, 2023

(54) USING TRANSACTION DATA TO PRESENT SEARCH RESULTS

(71) Applicant: Block, Inc., San Francisco, CA (US)

(72) Inventors: Mohsen Sardari, Burlingame, CA (US); Yi Li, Millbrae, CA (US); Kin Ho Lee, Toronto (CA); Nic Kleene, San Francisco, CA (US); Ankit Dutta, San Francisco, CA (US); Pooja Choudhary, Redwood City, CA (US); Yibo Chen, Shanghai (CN)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/902,178

(22) Filed: Sep. 2, 2022

(51) Int. Cl.
*G06Q 20/40* (2012.01)
*G06F 16/2457* (2019.01)

(52) U.S. Cl.
CPC ... *G06Q 20/4016* (2013.01); *G06F 16/24578* (2019.01); *G06Q 20/40* (2013.01)

(58) Field of Classification Search
CPC ............................ G06Q 20/40; G06F 16/2457
See application file for complete search history.

(56) References Cited

U.S. PATENT DOCUMENTS 9,373,112 B1 * 6/2016 Henderson ......... G06Q 30/0201
2021/0182287 A1 * 6/2021 Agarwal ................ G06N 20/00

* cited by examiner

*Primary Examiner* — Scott S Trotter
(74) *Attorney, Agent, or Firm* — Lee & Hayes, P.C.

(57) ABSTRACT

Using transaction data to rank search results is described. A payment service computing platform may receive transaction data associated with users of a payment service, and may receive a search query from a payment application associated with the payment service and executing on a device of a user. The payment service computing platform may then generate a list of entities based at least in part on a likelihood, determined using a portion of the transaction data associated with the entities, that the user will be able to successfully complete a transaction in association with the entities, and may cause a user interface of the payment application to present at least a portion of the list of entities as a search result to the search query.

20 Claims, 13 Drawing Sheets

USING TRANSACTION DATA TO PRESENT SEARCH RESULTS

TECHNICAL FIELD

Applications, which are downloadable and executable on user devices, enable users to interact with other users. Such applications are provided by service providers and utilize one or more network connections to transmit data among and between user devices to facilitate such interactions. Such applications can also enable users to submit search queries and receive search results.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
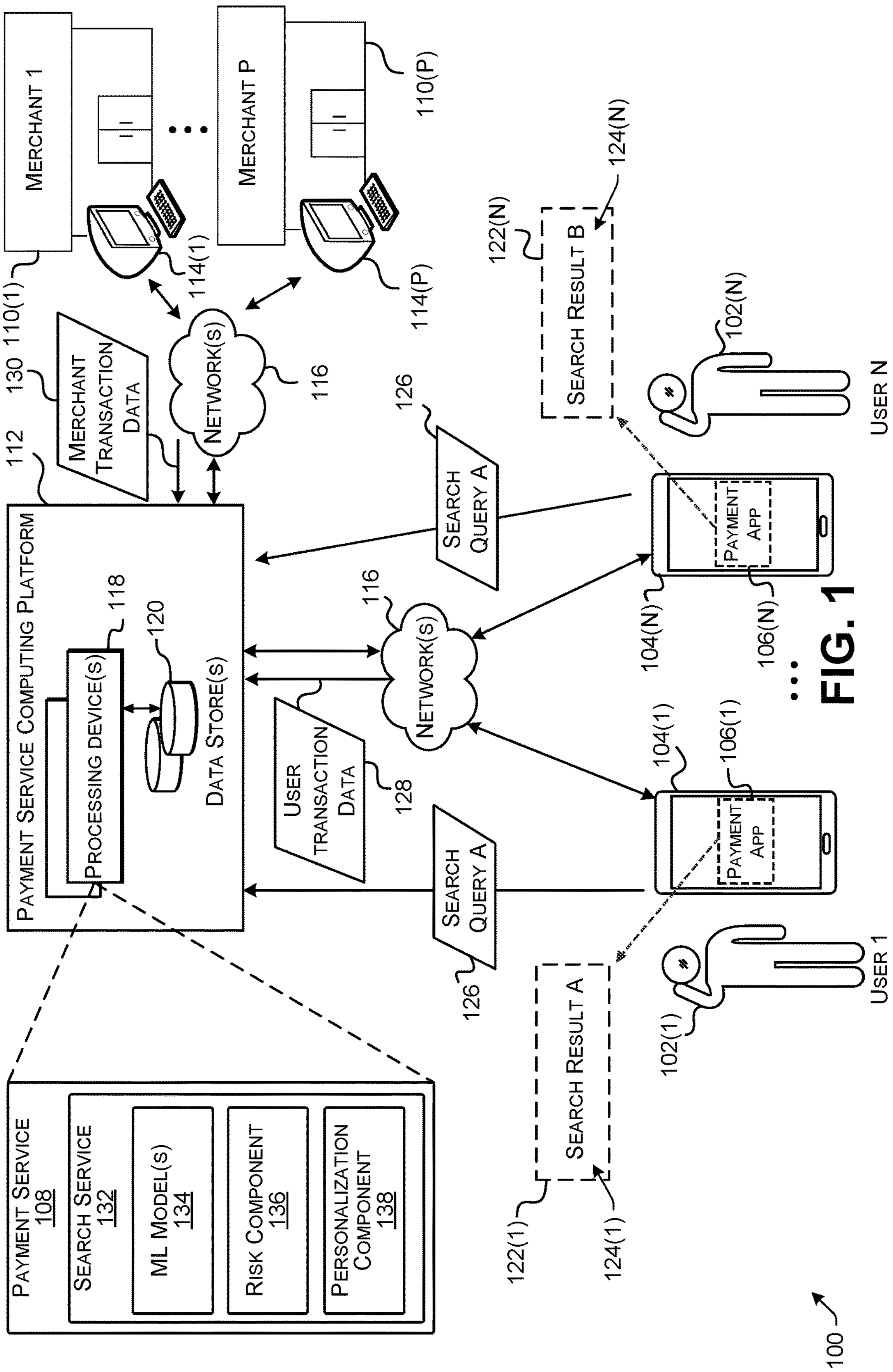
FIG. 1 is an example environment for using transaction data, interaction data, or the like to generate search results, according to an implementation of the present subject matter.

Described herein are, among other things, techniques, devices, and systems for using transaction data, interaction data, or the like to generate search results. In an example, a computing platform associated with a payment service (hereinafter, a "payment service computing platform") may receive transaction data, interaction data, or other data representative of user interactions with the payment service computing platform. At least a portion of the transaction data may be associated with users of the payment service based on transactions, such as payments made, by users of the payment service. Additionally, or alternatively, at least a portion of the transaction data may be associated with entities (e.g., merchants, items (e.g., goods or services) offered for sale by the merchants, etc.) based on transactions, such as payments received, by merchants when using the payment service. In an example, instances of a payment application serviced by the payment service computing platform execute on electronic devices of users to facilitate transactions and other operations as described herein. As users and merchants of the payment service engage in transactions, transaction data, and/or other interaction data, can be collected by the payment service computing platform. In some examples, such transaction data, interaction data, or the like, can be used to intelligently and/or dynamically generate search results, which in some examples, can be personalized or customized based on the transaction data, interaction data, or the like.

In some examples, a search service associated with the payment service computing platform enables users to search for entities, such as merchants, merchant locations, other users, groups of users, items offered for sale, incentives, or the like, by submitting a search query within the payment application. Upon receiving a search query from such a payment application executing on a device of a user, the payment service computing platform may generate and return a list of entities as a search result to the search query. In some examples, the entities can be ranked or otherwise arranged in the list based on one or more criteria (e.g., relevance) or metrics (e.g., likelihood of completion), as described herein. That is, in some examples, techniques described herein can utilize transaction data, interaction data, or the like to intelligently generate search results, such as listings of entities. In at least one example, such search results can be intelligently generated using machine-learning techniques, application of rules, and/or the like. In some examples, such intelligent generation can be based on risk and/or relevance metrics. Additionally or alternatively, in some examples, techniques described herein can dynamically modify permissions or permitted interactions for individual transactions or interactions based on such transaction data, interaction data, or the like.

In some examples, a metric used to rank entities in a list returned as a search result can be a likelihood of successful completion of a transaction. In such examples, the search result includes a list of entities generated based at least in part on a likelihood that the user will be able to successfully complete a transaction in association with the entities, wherein the likelihood is determined using a portion of the transaction data associated with the entities. As used herein, a transaction is "successful" (or is "successfully completed") if the transaction is authorized during a checkout process. By contrast, a transaction is "unsuccessful" (or "fails to complete") if the transaction is declined during a checkout process. By generating, as a search result, a list of entities with/for which the user is likely to be able to successfully complete a transaction, the techniques disclosed herein mitigate or reduce instances where a user attempts to complete a transaction in association with an entity (e.g., by completing part, but not all, of a checkout process) and the transaction is ultimately unsuccessful (e.g., declined during the checkout process). That is, by deprioritizing or "hiding" merchants with/for which the user is not likely to be successful or merchants that are not relevant to the user, techniques described herein can present more relevant data to a user to streamline interactions and reduce friction for users.

In conventional search techniques, search results are not generated based on transaction data associated with a payment service. As such, when a user of a conventional search service attempts to transact with, say, a merchant that is returned as part of a search result to the user's search query, the user may be unable to transact with the merchant for various reasons (e.g., the user may have defaulted on too many loan payments in the past, the merchant may have been involved in too many chargebacks with consumers in the past, etc.). Declining transactions is a waste of computing resources because the computing resources are used to initialize and partially process transactions before they are ultimately declined, typically towards the end of an electronic checkout process. Thus, the techniques, devices, and systems disclosed herein conserve computing resources by using transaction data to generate and present a list of entities with/for which the user is likely to be able to successfully complete a transaction at a time when a user submits a search query, thereby mitigating or reducing instances of a user selecting an entity from a search result and being unable to successfully complete a transaction in association with the selected entity. In addition to conserving computing resources, the techniques, devices, and systems disclosed herein provide an improved search experience, as compared to conventional search techniques; namely, by returning search results that increase the likelihood of the user successfully completing a transaction.

In some examples, the techniques, devices, and systems described herein may assess risk in generating a list of entities as a search result to a user's search query. Such risk can be assessed with or without identifying the user who submits the search query. For an unidentified user, the user may be an unregistered user, and/or the user may not be logged into the payment application or a payment service website at a time of submitting a search query. Furthermore, when an unidentified user submits a search query, the search query itself may not include a user identifier. In these examples, the payment service computing platform may determine respective risk metrics associated with candidate entities, such as merchants, to be returned in a search result to the unidentified user's search query. In this way, even for an unidentified user, the payment service computing platform may be configured to generate, as a search result, a list of entities with/for which the unidentified user is likely to be able to successfully complete a transaction, such as by generating a list of "low" risk entities (e.g., merchants associated with risk metrics that fail to satisfy a threshold). For an identified user, the user may be identified prior to, at a time of, or shortly after submitting a search query. For example, a user may be identified upon logging into the payment application. As another example, a user may be identified from the search query (e.g., by the payment application including a user identifier, such as a universally unique identifier (UUID), in the search query) that is received by the payment service computing platform. In these examples, the payment service computing platform may determine a risk metric associated with the identified user. This user risk metric may be determined in addition to, or in lieu of, the risk metrics associated with the entities being searched. Such risk metrics may be determined based at least in part on the transaction data that is accessible to the payment service computing platform. To illustrate how risk may be utilized in returning search results, if a risk metric associated with the user indicates that the user is a high risk user (e.g., because the user has defaulted on one or more past loan payments, and/or because the user has made one or more late payments in the past, etc.), the list of entities generated as a search result to the user's search query may exclude high risk entities (e.g., merchants) and may include low risk and/or medium risk entities (e.g., merchants). In this scenario, excluding high risk entities (and possibly medium risk entities) from the search result increases the likelihood that the high risk user will be able to successfully complete a transaction in association with the entities returned in the search result.

In some examples, risk may be utilized in other ways in addition to returning search results. For example, based on a user risk metric associated with a user, the user may be limited or restricted to completing a maximum number of transactions, a maximum frequency of transactions, and/or transactions at a maximum transaction amount (e.g., in total/aggregate, per transaction, etc.) in association with an entity (e.g., a merchant, an item, etc.). That is, risk can be used to dynamically modify permissions or permitted interactions for users. To illustrate, if a user is determined to be a high risk user, and if the user decides to conduct a transaction in association with one of the entities (e.g., a high risk entity) returned in a search result to the user's search query, the user may be restricted to a particular number and/or frequency of transactions and/or to a particular transaction amount in association with the selected entity (e.g., the high risk user may be allowed to conduct no more than two transactions with a selected merchant, such as a high risk merchant). Furthermore, once the user has reached the maximum number and/or frequency of transactions and/or the maximum transaction amount in association with the entity, the payment service computing platform may exclude the entity from future search results returned to the user. For example, if the user has reached the limit of two transactions with a particular merchant, and if the user subsequently submits a search query for an item sold by that merchant, the search result returned to the user's search query may not include the merchant due to the transaction limit having been reached, notwithstanding the relevancy of the merchant to the search query.

Another example of utilizing risk is to dynamically modify (e.g., restrict, limit, etc.) the terms of loans offered to users. For example, a high risk user may be offered a loan (e.g., a buy now, pay later loan) to purchase an item from a merchant returned in a search result to the user's query, but the terms of the loan may be based on the high risk metric associated with the user, such as stricter terms that require repayments at a higher amount and/or frequency than the terms offered to medium risk users and/or low risk users. Another example way of utilizing risk is to dynamically modify (e.g., restrict, limit, etc.) the payment options offered to a user during a checkout process. For instance, if a search result is returned to a user's search query, and if the user selects an entity from the search result, a user interface of the payment application may display a subset of available payment options for purchasing an item from the selected entity. For example, available payment options may include a credit card, a debit card, and a loan (e.g., an installment loan or the like), and a high risk user may be allowed to use the debit card as a payment option, but not the credit card or the loan as a payment option. Accordingly, the high risk user may be shown a subset of the available payment options (e.g., the debit card) at checkout, and the user may not be given the opportunity to use the other payment options.

In some examples, the techniques, devices, and systems described herein may personalize or otherwise customize the search results for a user in order to return a personalized list of entities that are most appropriate and/or relevant for the user. For example, user data associated with an identified user (e.g., a user who is logged into the payment application and/or a user identified from a search query, etc.) can be used to determine user preferences and/or user predilections to filter and/or rank the entities returned as a search result to the user's search query. Accordingly, the techniques, devices, and systems disclosed herein are configured to return, as a search result to a user's search query, entities that not only increase the likelihood of the user being able to successfully complete a transaction, but that are also relevant to the user. Thus, two different users who submit the same search query may receive different search results, from a personalization perspective and/or a risk perspective. By presenting search results that are personalized or customized to individual users, techniques described herein can ensure relevant results are presented to the users. In some examples, filtering or ranking entities so that relevant results are presented to users can improve functionality of computing devices by causing user interfaces to be less cluttered and easier to interact. For small form factors, such as mobile devices or wearables, this personalization or customization can optimize how content is displayed and accessed, thereby offering an improvement to the functionality of computing devices.

In some examples, machine learning model(s) are trained and utilized as machine-trained model(s) to assess risk and/or to personalize search results, among other things. For example, the payment service computing platform may collect user data and/or merchant data as users setup user profiles with the payment service, as merchants setup merchant profiles with the payment service, and as users and merchants use the payment service to, among other things, complete transactions. In some examples, the payment service computing platform can additionally or alternatively access third-party or non-payment related first-party data representative of user interactions with other services and/or computing platforms. Over time, one can appreciate that a large collection of user data (e.g., user transaction data) tied to registered user accounts and/or merchant data (e.g., merchant transaction data) tied to registered merchant accounts may be available to the payment service computing platform. The payment service computing platform can then train one or more machine learning models based on a portion of the previously collected data as a training dataset, whereby the machine learning model(s) can learn to make one or more predictions, such as determining a risk metric(s) associated with a given user and/or a given entity (e.g., a merchant, an item, etc.), and/or determining a relevance metric of an entity (e.g., a merchant, an item, etc.) to a given user in the context of search. Such machine-trained model(s) can be used to surface entities in search results that a user is most likely, and most likely to be able to, transact with, thereby conserving computing resources by mitigating instances of unsuccessful transactions, as well as improving the search experience for users, in part by making it convenient for the users to discover entities with/for whom the users are likely to transact. By contrast, users of conventional search services tend to be overwhelmed by the search results returned to them, and many of the search results may be irrelevant and/or uninteresting to the user of conventional search services.

Because it is both computationally intensive and time consuming to execute machine-trained models at runtime, conventional search techniques that utilize machine learning tend to use fewer signals and/or data, and, as a result, the search results returned by conventional search techniques are less accurate. Techniques are described herein for training and/or utilizing machine-trained model(s) in a computationally- and/or time-efficient manner in order to conserve computing resources and/or reduce latency in returning search results at runtime. For example, the disclosed machine-trained model(s) can be run offline to determine a risk metric(s) associated with a user and/or with entities (e.g., merchants) prior to receiving a search query from a user. In this manner, the computationally intensive and time consuming task of assessing the risk of the user and/or the entities (e.g., merchants) can be performed by running machine-trained model(s) offline so that the risk metric(s) is ready, as needed at a time at which a search query is received from the user, and so that more accurate search results are returned with lower latency, as compared to conventional search techniques that utilize machine learning. As another example, because it can be wasteful (from a computing resource standpoint) to run machine-trained models at a high frequency when transaction data does not change significantly at a high rate, techniques are described herein for utilizing machine-trained model(s) as-needed (e.g., in response to receiving updated transaction data). For instance, if a user of the payment service is inactive for a period of time without conducting a transaction using the payment service, it may be wasteful to run a machine-trained model(s) to determine a user risk metric associated with the user. Accordingly, the payment service computing platform may be configured to monitor for a cue(s)/event(s) (e.g., receiving updated transaction data associated with a user) before executing the machine-trained model(s) to determine a risk metric associated with the user.

While several examples presented herein are directed to ranking search results in the context of a payment service, the techniques described herein are also applicable to other types of services that allow users to search for entities. Examples of other types of services besides payment services include electronic commerce (ecommerce) services, social networking services, gaming services, a merchant service, a loyalty program service, a loan service (e.g., capital loan, buy now pay later loan, etc.), a music, podcast and/or video streaming service, or the like.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of the Figures and Claims.

FIG. 1 is an example environment 100 for using transaction data, interaction data, or the like to generate search results, according to an implementation of the present subject matter. As depicted, the example environment 100 may include users 102(1) to 102(N) (collectively 102, where N is any suitable integer greater than one). Respective users 102 may be associated with respective electronic devices 104(1) to 104(N) (collectively 104), the electronic devices 104 being configured to execute respective applications, e.g., payment applications 106(1) to 106(N) (collectively 106, and interchangeably referred to as payment "app" 106). The payment applications 106, when executing on the respective electronic devices 104, may allow the respective users 102 to navigate to the various user interfaces described herein, and to interact with or access services, such as a payment service 108. In some examples, the respective users 102 can interact with the user interfaces, for example, to facilitate transactions (e.g., electronic payments) with other users 102 and/or with merchants 110(1) to 110(P) (collectively 110, where P is any suitable integer greater than one) associated with the payment service 108. In some examples, the payment application 106 allows two users 102 who are "peers" to transfer funds in a "peer-to-peer (P2P)" transaction. In some examples, the payment application 106 allows a merchant 110 and a customer of the merchant 110 to transfer funds between each other, such as when the customer is purchasing an item(s) from the merchant 110. In at least one example, the payment application allows for the efficient transfer of funds (e.g., fiat currency, securities (e.g., stocks, bonds, mutual funds), cryptocurrencies, gift cards, etc.) between users 102 and/or between customers and merchants 110 of the payment service 108. Such transfers can be "efficient" in that they can happen electronically, in real-time or near real-time, due to a complex integration of software and hardware components configured to facilitate such transfers. In some examples, the payment applications 106(1) to 106(N) can be different instances of a same payment application, which can be provided, and serviced, by a payment service computing platform 112. For example, the users 102 may download and install a particular version of the payment application 106 on their electronic devices 104, either via a first time installation, a software update, or the like.

As depicted by FIG. 1, the respective electronic devices 104 and/or merchant computing devices 114(1) to 114(P) (collectively 114) used by the merchants 110 may be coupled to the payment service computing platform 112 via one or more network(s) 116, such as a wide area network (WAN) (e.g., the Internet, a cellular network, etc.). In some examples, the payment service computing platform 112 may include a cloud-based computing architecture suitable for hosting and servicing the respective payment applications 106 executing on the respective electronic devices 104. In particular examples, the payment service computing platform 112 may include a Platform as a Service (PaaS) architecture, a Software as a Service (SaaS) architecture, an Infrastructure as a Service (IaaS), a Data as a Service (DaaS), a Compute as a Service (CaaS), or other similar cloud-based computing architecture (e.g., "X" as a Service (XaaS)). The payment service computing platform 112 may be used to implement the aforementioned payment service 108, as described herein.

A service provider may operate the payment service computing platform 112, which may include one or more processing devices 118, such as one or more servers, and one or more data stores 120. The one or more processing devices 118 may be configured to provide processing or computing support for the respective payment applications 106 executing on the respective electronic devices 104. The data stores 120 may include, for example, one or more internal data stores that may be utilized to store data (e.g., transaction data) associated with respective users 102 and/or with respective merchants 110.

In some examples, the payment service computing platform 112 may be a hosting and servicing platform for the respective payment applications 106 executing on the respective electronic devices 104. As depicted by FIG. 1, the respective payment applications 106 may each include, for example, respective user interfaces 122(1) to 122(N) (collectively 122) for displaying, among other data, respective search results 124(1) to 124(N) (collectively 124). The search results 124 may be different for the individual users 102. For example, in FIG. 1, the first user 102(1) (User 1) and the Nth user 102(N) (User N) may submit the same search query 126 (Search Query A, such as the word "bike"). Even though the respective users 102(1) and 102(N) submit the same search query 126, the users 102 may receive different search results 124 on their respective electronic devices 104(1) and 104(N). For example, FIG. 1 illustrates that the first user 102(1) (User 1) receives a first search result 124(1) (Search Result A) that is different than an Nth search result 124(N) (Search Result B) received by the Nth user 102(N) (User N). The difference between the search results 124(1) and 124(N) may be due to a variety of reasons. For example, in assessing risk, the payment service computing platform 112 may determine that the first user 102(1) (User 1) is a high risk user (e.g., a first user risk metric associated with the first user 102(1) (User 1) satisfies a first threshold), and that the Nth user 102(N) (User N) is a low risk user (e.g., a second user risk metric associated with the Nth user 102(N) (User N) fails to satisfy a second threshold). In this scenario, the entities (e.g., merchants 110, items, etc.) returned in the first search result 124(1) (Search Result A) may be different than the entities (e.g., merchants 110, items, etc.) returned in the Nth search result 124(N) (Search Result B), and this difference in the search results 124 may be based on the difference between the respective user risk metrics.

Search results 124 can also vary between users based on personalization. For example, first user preference data associated with the first user 102(1) (User 1) may indicate that the first user 102(1) (User 1) has a predilection for, say, local merchants 110 (e.g., merchants 110 associated with merchant locations that are within a threshold distance of a location (e.g., a shipping address) associated with the first user 102(1)), while second user preference data associated with the Nth user 102(N) (User N) may indicate that the Nth user 102(N) (User N) has a predilection for, say, a particular brand of products and/or services. In this scenario, the entities that are returned in the first search result 124(1) (Search Result A) may be personalized for the first user 102(1) (User 1) (e.g., local merchants 110 may be ranked higher in the first search result 124(1)), and such entities may be different than the entities returned in the Nth search result 124(N) (Search Result B), which is personalized for the Nth user 102(N) (User N) (e.g., merchants 110 and/or items associated with a particular brand).

As depicted in FIG. 1, the payment service computing platform 112 may receive, from the electronic devices 104, user transaction data 128 associated with the users 102. Furthermore, the payment service computing platform 112 may receive, from the merchant computing devices 114, merchant transaction data 130 associated with the merchants 110. It is to be appreciated that at least a portion of this transaction data 128, 130 may be associated with any suitable "entity" that is searchable on the platform 112. "Entities," as used herein, may include merchants 110 (e.g., brands, stores, businesses, etc.), items (e.g., goods, services, etc.) offered for sale by the merchants 110, incentives (e.g., discounts, rewards, kickbacks, etc.), other users 102 (e.g., people, etc.) with whom an individual user 102 can transact using the payment service 108 (e.g., a peer-to-peer payment), groups (e.g., groups of users 102), events (e.g., fundraisers), and/or any other suitable entity that is searchable and displayable in a search result 124 to a search query 126.

The transaction data 128, 130 may be received at any suitable time and/or via any suitable software executing on the devices 104, 114. For example, the users 102 may input information via the payment application 106, via a webpage, via an instant app (e.g., a portion of an application), or the like. The information provided by the user 102 may cause user data, including the user transaction data 128, to be sent by the electronic device 104 to the payment service computing platform 112 over the network(s) 116. Similarly, as merchants 110 interact with (e.g., sell items to) users 102 of the payment service 108, software executing on the merchant computing devices 114 which may cause merchant data, including the merchant transaction data 130, to be sent by the merchant computing devices 114 to the payment service computing platform 112 over the network(s) 116. The transaction data 128, 130 received by the payment service computing platform 112 over the network(s) 116 may be processed (e.g., analyzed) and/or stored within the data store(s) 120. Examples of transaction data 128, 130 are described in more detail below with reference to FIG. 2.

As shown in FIG. 1, the payment service 108 may include and/or utilize a search service 132 to return search results 124 to search queries 126 that are submitted by users 102. The search service 132 may utilize one or more machine learning models 134 (sometimes referred to herein as "machine-trained models 134"), a risk component 136, and/or a personalization component 138. The machine-trained model(s) 134, the risk component 136, the personalization component 138, the search service 132, and/or the payment service 108 may represent computer-executable instructions that, when executed by a processor(s) (e.g., a processor(s) of the processing device 118) cause performance of one or more operations described herein. The risk component 136 may be configured to determine a risk metric(s) associated with a user 102 and/or with an entity (e.g., a merchant 110, an item, etc.), sometimes with the use of a machine-trained model(s) 134. The personalization component 138 may be configured to personalize search results for the user 102, sometimes with the use of a machine-trained model(s) 134. In general, the search service 132 is configured to receive and process a search query 126 using the risk component 136, the personalization component 138, and/or the machine-trained model(s) 134 to generate a list of entities to be returned as a search result 124 for display via a user interface 122 of the payment application 106. In some examples, the search service 132 can rank or otherwise arrange the list of entities based on, for example, risk, relevance to a particular user (e.g., personalization), or the like.

Machine learning can involve processing a set of examples (called "training data" or a "training dataset") in order to train a machine learning model(s). A machine learning model(s) 134, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input.

In the context of a machine-trained model(s) 134 used by the risk component 136, the unknown input may include any suitable data (e.g., transaction data 128, 130) associated with a user 102 and/or with entities (e.g., merchants 110, items, etc.) and/or a signal(s) that is/are generated based on such data. Such a machine-trained model(s) 134 may be tasked with outputting a risk metric (e.g., a value, a score, a binary (risky, not risky) indication, etc.) based on the input data. In some examples, the risk metric may indicate, or otherwise relate to, a relative level of risk for a particular entity. In some examples, the risk metric may indicate, or otherwise relate to, a probability of the user 102 and/or an entity (e.g., a merchant 110, an item, etc.) being in one of multiple classes. The multiple classes can include at least a first risk class or a second risk class that is different than the first risk class. In some examples, the first risk class may represent a low risk class and the second risk class may represent a high risk class. In some examples, the multiple risk classes may include a low risk class, a high risk class, and one or more intermediate risk classes, such as a medium risk class, but it is to be appreciated that risk may be assessed and/or determined at any suitable level of granularity. Accordingly, a risk metric that is determined for a user is not limited to one of high risk, medium risk, or low risk. For example, a risk metric may be determined as a score (e.g., a score within a range of zero to one, where the score can be calculated at any suitable number of significant digits, such as a score of 0.05, 0.4, 0.757, etc.). In an example, the risk metric may relate to a probability of the user 102 and/or an entity (e.g., a merchant 110, an item, etc.) being in a low risk class (or tier), a medium risk class (or tier), or a high risk class (or tier). In some examples, a risk metric(s) determined by the risk component 136 (e.g., using a machine-trained model(s) 134) may relate to a probability of a transaction associated with a user 102 and/or an entity (e.g., a merchant 110, an item, etc.) being unsuccessful (or successful, as the case may be).

In the context of a machine-trained model(s) 134 used by the personalization component 138, the unknown input may include any suitable data (e.g., transaction data 128, 130, preference data, profile data, etc.) associated with a user 102 and/or with entities (e.g., merchants 110, items, etc.) and/or a signal(s) that is/are generated based on such data. Such a machine-trained model(s) 134 may be tasked with outputting a relevance metric (e.g., a value, a score, a binary (relevant, irrelevant) indication, etc.) based on the input data. The relevance metric may indicate, or otherwise relate to, a probability of an entity (e.g., a merchant 110, an item, etc.) being relevant to the user 102. For instance, the relevance metric may relate to a probability of the entity (e.g., a merchant 110, an item, etc.) being in a relevant class or an irrelevant class.

In some examples, a metric output by a machine-trained model(s) 134 is a variable that is normalized in the range of [0,1]. In some examples, the trained machine learning model(s) 134 may output a set of probabilities (e.g., two probabilities), or metrics relating thereto, where, for risk, one probability (or metric) relates to the probability of a transaction associated with the user 102 and/or the entity being unsuccessful, and the other probability (or metric) relates to the probability of the transaction being successful. The risk metric that is output by the trained machine learning model(s) 134 can relate to either of these probabilities in order to guide the determination of whether to include an entity in a search result 124 or to exclude the entity from the search result 124. A relevance metric may be output in a similar way for personalization. In some examples, a metric output by a machine-trained model(s) 134 represents a confidence (e.g., a probability) of the output. Additionally, or alternatively, the trained machine learning model(s) 134 may be configured to output a confidence metric (e.g., a confidence value, a confidence score, etc.) associated with the primary output result (e.g., prediction) in order to indicate a confidence level of the machine-learned prediction.

The trained machine learning model(s) 134 may represent a single model or an ensemble of base-level machine learning models, and may be implemented as any type of machine learning model. For example, suitable machine learning models 134 for use in the techniques and systems described herein include, without limitation, neural networks (e.g., deep neural networks (DNNs), recurrent neural networks (RNNs), etc.), tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof Δn "ensemble" can comprise a collection of machine learning models 134 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training dataset that is used to train the machine learning model 134 may include various types of data, including previously collected user data associated with users 102 of the payment service 108 and/or previously collected merchant data associated with merchants 110 associated with the payment service 108, as will be described in more detail below. For risk, the training dataset may include transaction data 128, 130, as well as any other suitable user data and/or merchant data, as described herein, such as the data and/or signals described below with reference to FIG. 2. For example, the training dataset used for training a machine learning model 134 to determine a user risk metric may include transaction data 128, 130 associated with the user 102, user interaction data associated with the user 102, the user interaction data indicating interactions of the user 102 with other users of the payment service 108, third party data associated with the user 102, the third party data having been received from one or more external services, tenure data associated with the user 102, the tenure data indicating a length of time the user 102 has been a registered user of the payment service 108, demographic data associated with the user 102, contact data associated with the user 102, behavioral data associated with the user 102, financial data associated with the user 102, and/or user preference data associated with the user 102. For personalization, the training dataset may include transaction data 128, 130 (e.g., purchase history), as well as profile data (e.g., user profile data, merchant profile data, etc.), preference data user, search history data, external data (e.g., from social networks), interaction data (e.g., content accessed, viewed, clicked on, etc.), investing data (e.g., stocks purchased, etc.), and/or any other suitable data and/or signals, such as those described below with reference to FIG. 2. In general, a training dataset for machine learning can include two components: features and labels. However, the training dataset used to train the machine learning model(s) 134 may be unlabeled, in some embodiments.

Accordingly, the machine learning model(s) 134 may be trainable using any suitable learning technique, such as supervised learning, unsupervised learning, semi-supervised learning, reinforcement learning, and so on. The features included in the training dataset can be represented by a set of features, such as in the form of an n-dimensional feature vector of quantifiable information about an attribute of the training dataset. As part of the training process, weights may be set for machine learning. These weights may apply to a set of features included in the training data, as derived from historical data (e.g., previously collected user data) in the datastore 120. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the output of the trained machine learning model 134.

The search service 132 is configured to generate a list of entities (e.g., merchants 110, items, etc.) as a search result 124. To generate the list of entities, the search service 132 may utilize the machine-trained model(s) 134, the risk component 136, and/or the personalization component 138. In some examples, the list of entities can be generated based at least in part on a likelihood, determined using a portion of the transaction data 128, 130 associated with the entities (e.g., merchants 110, items, etc.), that the user 102 will be able to successfully complete a transaction in association with the entities. Accordingly, the search result 124 may include a list of entities (e.g., merchants 110, items, etc.) that the user 102 is likely to be able to transact with, and, if personalization is implemented, the entities in the list can be ranked by relevancy to the user 102 (e.g., a personalized list of entities). Furthermore, the user's 102 interactions with the search result 124 and/or transactions completed by the user 102 in association with entities returned in the search result 124 may be monitored and/or tracked for use in retraining the machine learning model(s) 134 used by the search service 132.

Figure 2:
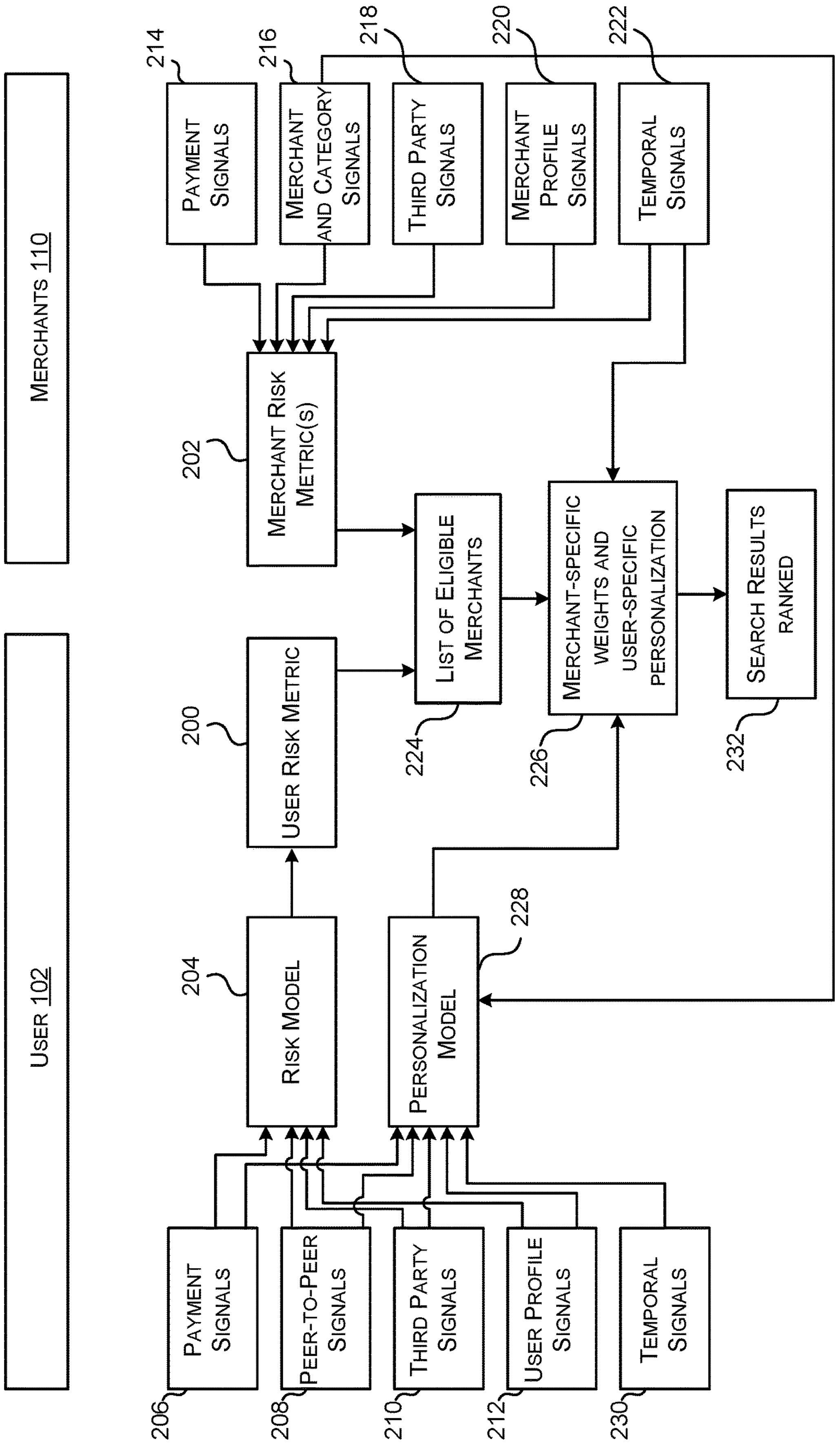
FIG. 2 is an example block diagram illustrating a technique of using transaction data to rank search results, according to an implementation of the present subject matter.

FIG. 2 is an example block diagram illustrating a technique of using transaction data 128, 130, among other data, to rank search results, according to an implementation of the present subject matter. The process described with reference to FIG. 2 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

In the example of FIG. 2, a user risk metric 200 associated with a user 102 is determined. Additionally, a merchant risk metric(s) 202 associated with a merchant(s) 110 is determined. The risk component 136 of FIG. 1 may determine these risk metrics 200, 202. In some examples, the risk metrics 200, 202 are determined using a machine-trained model(s) 134. For example, FIG. 2 illustrates a risk model 204 that is used to determine the user risk metric 200, where the risk model 204 may represent a machine-trained model(s) 134, as described herein. However, in some examples, the risk metrics 200, 202 is/are determined using a data without a machine-trained model(s) 134 and/or using one or more rules (i.e., a rules-based approach). For instance, FIG. 2 illustrates that the merchant risk metric(s) 202 may be determined based on one or more signals that are generated based on data associated with merchants 110. By contrast, signals generated based on data associated with the user 102 are provided as input to the risk model 204 to determine the user risk metric 200. This is merely an example, and it is to be appreciated that there are various ways to determine the risk metrics 200, 202 based on data, such as the transaction data 128, 130.

In the example of FIG. 2, signals provided as input to the risk model 204 include payment signals 206, peer-to-peer signals 208, third party signals 210, and user profile signals 212. These signals may be generated based on user data associated with a given user 102 of the payment service 108. In some examples, the aforementioned user transaction data 128 is used to generate the payment signals 206, the peer-to-peer signals 208, and/or the user profile signals 212. Thus, the user risk metric 200 may be determined based at least in part on user transaction data 128 associated with the user 102. It is to be appreciated, however, that additional user data besides user transaction data 128 may be used to determine the user risk metric 200, in some examples.

The payment signals 206 may be generated based on the user transaction data 128, which may include payment data indicating payments made by the user 102 using the payment application 106, a number of transactions associated with the user 102, transaction amounts (e.g., average spend of transactions), transaction frequencies, transactions times, payments made by the user 102 over a period of time (e.g., the past 180 days), lending data indicating loans made to the user 102, as well as number of loans, loan amounts, loan frequencies, etc., repayment data indicating repayments made by the user 102 to a lender, as well as repayment amounts, a number of late payments, late payments made by the user 102 over a period of time (e.g., the past 180 days), payment instrument data indicating payment instrument used (e.g., debit, credit, single-use), order data indicating items purchased, orders placed by the user 102 over a period of time (e.g., the past 180 days), a length of time since the user placed a first order with the payment service 108, investment data, or the like.

The peer-to-peer signals 208 may be generated based on user data (e.g., the user transaction data 128), which may include user interaction data indicating interactions of the user 102 with other users 102 of the payment service 108. For instance, the peer-to-peer signals 208 may indicate payments made to other users 102, payments received from other users 102, a frequency of such payments, times of such payments, payment amounts, demographics of other users 102 paid by the user, and/or non-payment interactions such as likes, mentions, and/or communications between (e.g., messages sent to and/or received from) the user 102 and other users 102 of the payment service 108.

The third party signals 210 may be generated based on third party data, which may include identity data indicating an identity verification of the user 102 (e.g., a white page identity check score), financial data indicating a credit score or other financial metrics of the user 102, fraud data indicating a fraud score or other fraud metrics of the user 102, third-party lending data indicating third-party loans, social networking data indicating social networking interactions, content data indicating content accessed and/or streamed using content providers, and/or the like. The third party data used to generate these third party signals 210 may be received from external (or third party) services with respect to the payment service 108, such as external identity verification service, credit monitoring service, fraud detection service, social networking service, content providing service, and/or the like.

The user profile signals 212 may be generated based on user data (e.g., the user transaction data 128), which may include tenure data indicating the user's tenure (e.g., a length of time the user 102 has been a registered user/customer of the payment service 108), demographic data indicating a demographic(s) of the user 102, contact data indicating contact information of the user 102 (e.g., a phone number(s), email address(es), etc.), behavioral data indicating behaviors (e.g., online behaviors) of the user 102, financial data of the user 102 (e.g., historical income level, tax data, payroll data, cash reserves, etc.), user preference data indicating preferences and/or predilections of the user 102, and the like. In some examples, the user profile signals 212 include a state match signal indicating whether an area code of the user's phone number (or another suitable location indicator, such as an Internet Protocol (IP) address, Global Positioning System (GPS) coordinates, etc.) is consistent with a shipping address(es) that the user 102 uses when placing orders for items using the payment service 108.

On the merchant 110 side of the block diagram of FIG. 2, several signals are used to determine the merchant risk metric(s) 202, including payment signals 214, merchant and category signals 216, third party signals 218, merchant profile signals 220, and temporal signals 222. These signals may be generated based on merchant data associated with merchants 110 associated with the payment service 108. In some examples, the aforementioned merchant transaction data 130 is used to generate the payment signals 214, the merchant and category signals 216, and/or the merchant profile signals 220. Thus, the merchant risk metric(s) 202 may be determined based at least in part on the merchant transaction data 130 associated with the merchants 110. It is to be appreciated, however, that additional merchant data besides merchant transaction data 130 may be used to determine the merchant risk metric(s) 202, in some examples.

The payment signals 214 may be generated based on the merchant transaction data 130, which may include payment data indicating merchant payment performance, chargeback rates, revenue rates, conversion rates, authorization rates (e.g., which may indicate a likelihood of a transaction succeeding with the merchant 110), capture rates, commission rates, a number of declines, chargebacks, etc., merchant category code (MCC), payments received by the merchant 110 via the payment service 108, a number of transactions associated with the merchant 110 (e.g., average transaction volume), transaction amounts (e.g., average spend of transactions, average transaction amount, etc.), transaction frequencies, transactions times, payments received by the merchant 110 over a period of time (e.g., the past 180 days), payment instrument used (e.g., debit, credit, single-use), inventory data indicating items available for sale, items available in inventory, order data indicating orders fulfilled by the merchant 110 over a period of time (e.g., the past 180 days), a length of time since the merchant 110 fulfilled a first order with the payment service 108, or the like.

The merchant and category signals 216 may be generated based on merchant data (e.g., the merchant transaction data 130), which may include merchant type data indicating a type of merchant, product data indicating categories of products, products sold at the merchant 110, a banned list of products, etc.

The third party signals 218 may be generated based on third party data, which may include fraud data indicating fraud patterns of the merchant 110, external data, or the like. The third party data used to generate these third party signals 218 may be received from external (or third party) services with respect to the payment service 108, such as external fraud detection service, social networking service, or the like.

The merchant profile signals 220 may be generated based on merchant data (e.g., the merchant transaction data 130), which may include tenure data may indicate the merchants' tenure indicating a length of time the merchant 110 has been a partner (e.g., registered) with the payment service 108, a merchant type, such as whether the merchant 110 is an in-network merchant or an out-of-network merchant, merchant risk, or the like.

The temporal signals 222 may be generated based on merchant data (e.g., the merchant transaction data 130), which may include temporal data indicating time-based attributes associated with the merchant 110, such as how recently the merchant 110 conducted a transaction using the payment service 108.

With the user risk metric 200 and the merchant risk metric(s) 202 determined, the payment service computing platform 112 may generate a list 224 of eligible merchants 110 based on the risk metrics 200, 202. The list 224 of eligible merchants 110 may represent those merchants 110 with whom the user 102 is likely to be able to transact successfully. In other words, ineligible merchants 110 who are excluded from the list 224 of eligible merchants 110 may be those merchants 110 who, based on the risk metrics 200, 202, are likely to result in an unsuccessful transaction with the user 102. This filtering may be based on the risk metrics 200, 202 themselves (e.g., exclude, from the list 224, any merchant 110 who is classified as a high risk merchant).

At block 226, the list 224 of eligible merchants 110 may be modified based on merchant-specific weights and/or user-specific personalization. For example, weights may be assigned to individual merchants 110 in the list 224 of eligible merchants 110, and these merchant-specific weights can be used to rank the merchants 110, re-rank the merchants 110, filter out (e.g., remove) merchants 110 from the list 224, or the like. The merchant-specific weights that are used to modify the list 224 may be indicative of a preference for surfacing the merchants 110 in the search result 124 for the user 102, and such a preference may be based on any suitable criterion or factor, such as a predicted revenue received by the payment service 108 for a transaction that is completed with the individual merchants 110, and/or other factors.

The user-specific personalization that is used to modify the list 224 at block 226 may be based on the output of a personalization model 228, which may represent a machine-trained model(s) 134, as described herein. The inputs to the personalization model 228 may include the payment signals 206, the peer-to-peer signals 208 associated with the user 102, the third party signals 210 associated with the user 102, the user 212 profile signals associated with the user 102, and/or temporal signals 230 associated with the user 102, where the temporal signals 230 may indicate time-based attributes associated with the user 102, such as how recently the user 102 conducted a transaction using the payment service 108 and/or the payment application 106. In some examples, the temporal signals 230 may include deals or short term discounts that a merchant is running, and/or recent outage data, which may indicate that the search service 132 should exclude and/or deprioritize merchants that are currently experiencing an outage. In some examples, the merchant and category signals 216 may also be provided as input to the personalization model 228. That is, the personalization of the entities returned to the user 102 in the search result 124 may be based at least in part on the type of merchant, the categories of products associated with the merchant, the products sold at the merchant, and/or a banned list of products associated with the merchant. The output of the personalization model 228 may be used to rank the merchants 110, re-rank the merchants 110, filter out (e.g., remove) merchants 110 from the list 224, or the like.

At block 232, a ranked, personalized list of merchants 110 may be output as a search result 124 for the user 102 based on a search query 126 submitted by the user 102. For example, the payment service computing platform 112 may cause a user interface of a payment application 106 to present at least a portion of the ranked, personalized list of merchants 110 as a search result 124 to the search query 126 of the user 102.

While FIG. 2 relates to integrating both user and merchant risk metrics, in some examples, search results can be arranged based on individual of the risk metrics (e.g., user risk metric or merchant risk metric). That is, both risk metrics are not required to rank search results but using both risk metrics can provide improved accuracy or precision to ensure the most relevant and/or successful merchant are presented to the user.

Figure 3:
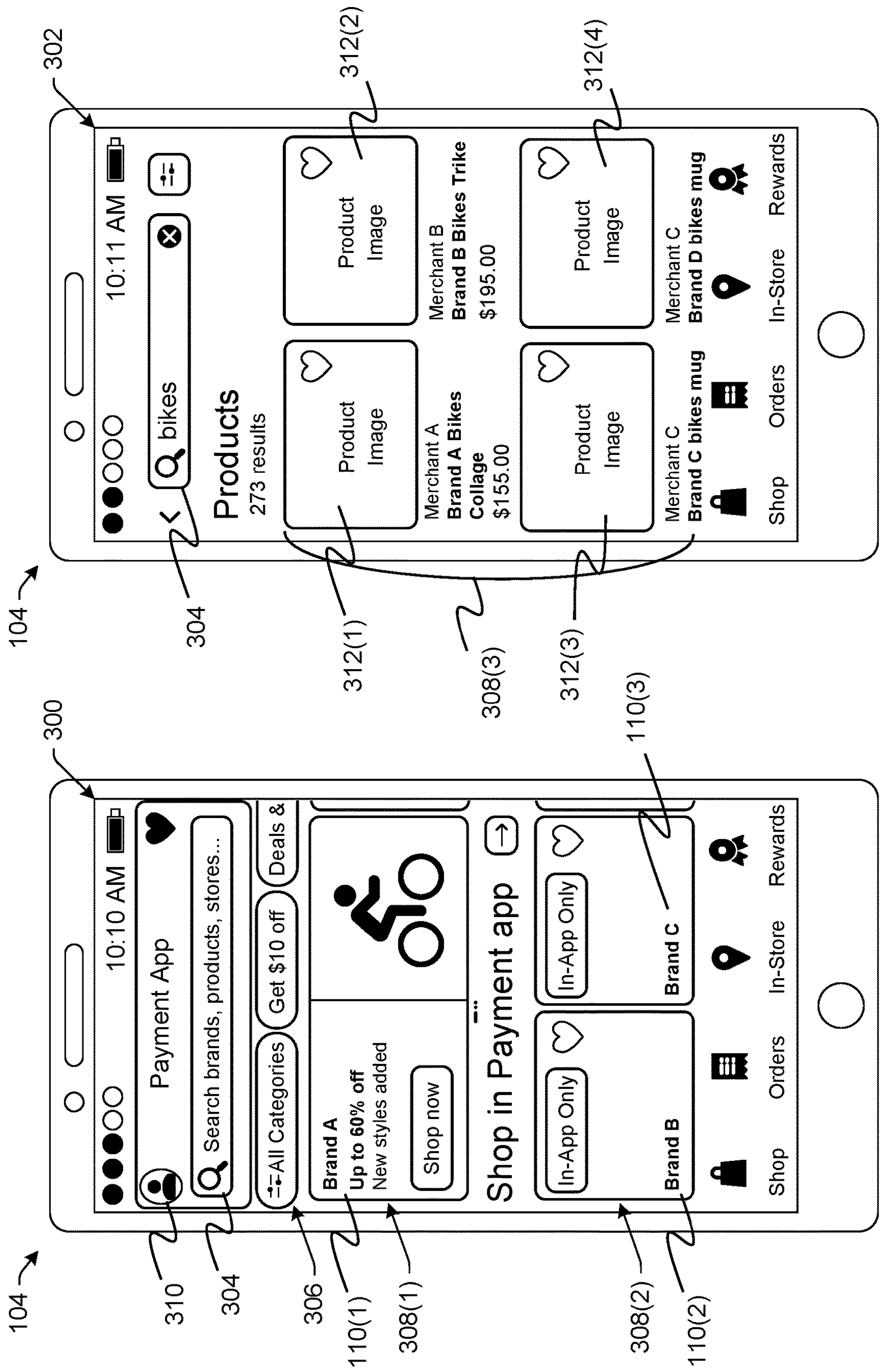
FIG. 3 illustrates example user interfaces, one of the user interfaces presenting at least a portion of a list of entities as a search result to a search query submitted by a user, according to an implementation of the present subject matter.

FIG. 3 illustrates example user interfaces 300 and 302, according to an implementation of the present subject matter. The user interfaces 300, 302 may represent examples of the user interfaces 122 described with reference to FIG. 1. In general, the payment service computing platform 112 may cause user interfaces to be displayed via the payment application 106 while the payment application 106 is executing on a user's electronic device 104. FIG. 3 shows an electronic device 104 of a user 102 at two instances of time. On the left of FIG. 3, at a first time, such as when the user 102 first opens (or launches) the payment application 106, the electronic device 104 displays a user interface 300 of the payment application 106. The user interface 300 includes one or more interactive elements with which the user 102 can interact (e.g., select via user input). For example, the user interface 300 may include an input element 304 (e.g., a search bar, search field, search entry box, etc.) via which the user 102 can provide user input to submit a search query 126, such as by selecting the input element 304 (e.g., via touch input) and subsequently typing a word or phrase. A virtual keyboard, or other input mechanism, may be presented in response to the user 102 selecting the input element 304, the virtual keyboard enabling the user 102 to type the word or phrase for the search query 126. The input element 304, prior to the user 102 typing the word or phrase, may include text (e.g., "Search brands, products, stores . . . ") to inform the user 102 as to what types of entities are searchable within the payment application 106. Other interactive elements presented in the user interface 300 may include a carousel 306 or other arrangement of interactive elements (e.g., buttons), such as an "All Categories" element that is selectable to browse categories of entities (e.g., merchants 110, items, etc.), a "Get $10 off" element that is selectable to obtain a discount on a to-be-completed transaction, and the like. The carousel 306 may be interacted with by scrolling (e.g., touching and dragging a finger) left or right in order to reveal additional interactive elements of the carousel 306 that are off-screen. Such interactive elements can be configured in additional or alternative configurations, for example, via a drop-down menu or other configuration.

The user interface 300 may further present one or more lists 308(1) and 308(2) of featured (or suggested) entities (e.g., merchants 110, items, etc.). The lists 308(1), 308(2) of featured entities may be interacted with by scrolling (e.g., touching and dragging a finger) left or right to reveal additional entities in the respective lists 308(1) and 308(2). A list, for purposes of this discussion, can comprise a grouping of one or more entities, which can be arranged in a listing. In some examples, portions of lists can be presented via user interfaces. Furthermore, the entities in the lists 308(1), 308(2) may be presented in the form of interactive elements, such as tiles (e.g., rectangular user interface elements), circles, etc. The tiles may be interacted with (e.g., selected) by the user 102 (e.g., touched with a finger) in order to navigate to another user interface where the user 102 can continue to browse and/or search in association with the selected entity (e.g., merchant 110, item, etc.) and/or complete a transaction in association with the selected entity. Although the lists 308(1), 308(2) of featured entities are not generated based on a search query 126, the lists 308(1), 308(2) may nevertheless be generated based at least in part on a likelihood, determined using a portion of the transaction data 128, 130 associated with the entities, that the user 102 will be able to successfully complete a transaction in association with the entities or another criteria or metric. For example, the entities (e.g., merchants 110, items, etc.) in the lists 308(1), 308(2) may be associated with risk metrics, such as merchant risk metrics 202 determined by the risk component 136, and the entities included in the lists 308(1), 308(2) may be those entities associated with risk metrics that fail to satisfy a threshold (e.g., low risk and/or medium risk entities). For example, a merchant 110(1) (Brand A) may be included in the list 308(1) based at least in part on a machine-trained model(s) 134 classifying the merchant 110(1) as a low risk merchant. Likewise, merchant 110(2) (Brand B) and merchant 110(3) (Brand C) may be included in the list 308(2) based at least in part on having been classified as low risk or medium risk merchants in a similar manner. Accordingly, the user 102 may be shown merchants 110 that, based on the merchant risk metrics 202 associated therewith, increase the likelihood of the user 102 being able to transact with the merchants 110, even before the user 102 submits a search query 126. In an additional or alternative example, the lists 308(1), 308(2) may be personalized or customized for the user using techniques described above.

In some examples, the user interface 300 may present an icon 310 indicating that the user 102 is logged into the payment application 106. After logging into the payment application 106, the user 102 can be identified by the payment service computing platform 112, and, hence, the payment service computing platform 112 may be able to determine a user risk metric and/or personalize the lists 308(1), 308(2) for the identified user 102, as described herein. Thus, even before a search query 126 is submitted by the user 102, the list(s) 308(1), 308(2) of featured entities presented via the user interface 300 of the payment application 106 may be ranked (e.g., by arranging the tiles in each list 308(1), 308(2) in a particular order) based on transaction data 128, 130, such as to increase the likelihood of the user 102 being able to transact in association with the entities in the list(s) 308(1), 308(2), and/or to surface entities that are relevant to the user 102 based on user preferences, search history, purchase history, or the like. In the example of FIG. 3, the lists 308(1), 308(2) may be horizontally scrollable (e.g., left-to-right and/or right-to-left), which can mean that the leftmost entities in the lists 308(1), 308(2) are the highest-ranked entities (or tiles), and lower-ranked entities (or tiles) can be revealed when the user 102 scrolls the individual lists 308(1), 308(2) in a leftward direction.

On the right of FIG. 3, at a second time subsequent to the first time, the user 102 has submitted a search query 126 by typing the word "bikes" into the input element 304 (e.g., search bar). In response to receiving the search query 126, the payment service computing platform 112 generates a list 308(3) of entities (e.g., merchants 110, items, etc.), and the electronic device 104 displays a user interface 302 of the payment application 106 that presents at least a portion of the list 308(3) as a search result 124 to the search query 126. Accordingly, the list 308(3) of entities is generated based on the search query 126 (e.g., by including, in the list 308(3), entities that are relevant to the search query 126; in this case, entities related to the search term "bikes"). The list 308(3) of entities may also be generated based at least in part on a likelihood, determined using a portion of the transaction data 128, 130 associated with the entities, that the user 102 will be able to successfully complete a transaction in association with the entities. For example, the list 308(3) may include low risk and medium risk entities, and the list 308(3) may exclude high risk entities (regardless of whether the user 102 is identified or unidentified), thereby increasing the chance of the user 102 successfully completing a transaction if the user 102 were to attempt a transaction in association with an entity selected from the list 308(3). If the user 102 has been identified and is determined to be a low risk user 102, the list 308(3) may include low risk, medium risk, and high risk entities, for example. In some examples, the entities may be ranked in the list 308(1) based at least in part on the aforementioned likelihood of the user 102 being able to successfully complete a transaction in association with the entities. Although the portion of the list 308(1) displayed via the user interface 302 is shown in FIG. 3 as a user interface 302 of the payment application 106, it is to be appreciated that the portion of the list 308(3) displayed via the user interface 302 may be an in-app ecommerce page (e.g., a "profile" or store within the payment application 106), a third-party ecommerce page presented via an in-app browser (e.g., an ecommerce page of a merchant 110, a webpage of a merchant 110, etc.).

In the example of FIG. 3, the list 308(3) may be scrollable in any suitable direction, such as vertically or horizontally. The user interface 302 is shown as presenting entities 312 (or tiles) in a 2×2 arrangement (e.g., two rows and two columns). Thus, if the user 102 were to scroll downward, for example, the four entities 312 (or tiles) shown in the user interface 302 of FIG. 3 may move upward and disappear to reveal more entities 312 (or tiles) in the list 308(3) from below, which move into the frame of the user interface 302 based on the scrolling user input. Additionally or alternatively, the user 102 may be able to scroll left or right to pan the list 308(3) left or right, causing more entities 312 (or tiles) in the list 308(3) to be revealed in the user interface 302. In the example of FIG. 3, the upper left entity 312(1) (or tile) may represent the highest-ranked entity in the list 308(3), the upper right entity 312(2) (or tile) may represent the second-highest-ranked entity in the list 308(3), and lower-ranked entities 312 (or tiles) may be presented to the right of, and/or or below, the top two entities 312(1) and 312(2) (or tiles) in the list 308(3). For example, the entities 312(3) and 312(4) (or tiles) may be ranked lower than the top two entities 312(1) and 312(2) (or tiles), and/or there may be additional entities that are off-screen/out-of-view. In some examples, the list 308(3) returned as a search result 124 to the search query 126 may represent a list 224 of eligible merchants 110 discussed above with reference to FIG. 2. That is, risk can be factored into the decision to include or exclude merchants 110 from the list 308(3), and eligible merchants that are included in the list may be associated with a risk metric that is appropriate for the given user 102. In some examples, the list 308(3) is ranked such that the most-eligible of the eligible merchants 110 are positioned at the top/beginning of the list 308(3). In some examples, the entities 312 are filtered and/or ranked using the personalization component 138 to generate the list 308(3) as a personalized list of entities 312. In some examples, entities 312 in the list 308(3) are ranked based on user data (e.g., user transaction data 128 associated with the user 102) and on merchant data (e.g., merchant transaction data 130 associated with the merchants 110 (e.g., Merchants A, B, and C) in the user interface 302). In some examples, a machine-trained model(s) 134 (e.g., the risk model 204, the personalization model 228, etc.) is/are used to determine risk metrics 200, 202 for generating the list 308(3) and/or for ranking the entities 312 to personalize the search result 124 for the user 102.

The user 102 may interact with (e.g., select, such as by touching the display) any of the entities 312 (or tiles) presented in the user interface 302 to view a product detail page and/or initiate a checkout process in association with the selected entity 312. In the user interface 302, the entities 312 represent products that are offered for sale by various merchants 110 (e.g., Merchants A, B, and C). Accordingly, if the user 102 interacts with (e.g., selects) the entity 312(2) associated with Merchant B, the user 102 may be shown a product detail page for the item (e.g., a product with the name "Brand B Bikes Trike").

The user interfaces 300 and 302 are provided as examples of user interfaces that can be presented to facilitate techniques described herein. User interfaces can present additional or alternative data in additional or alternative configurations. That is, user interfaces 300 and 302 should not be construed as limiting.

Figure 4:
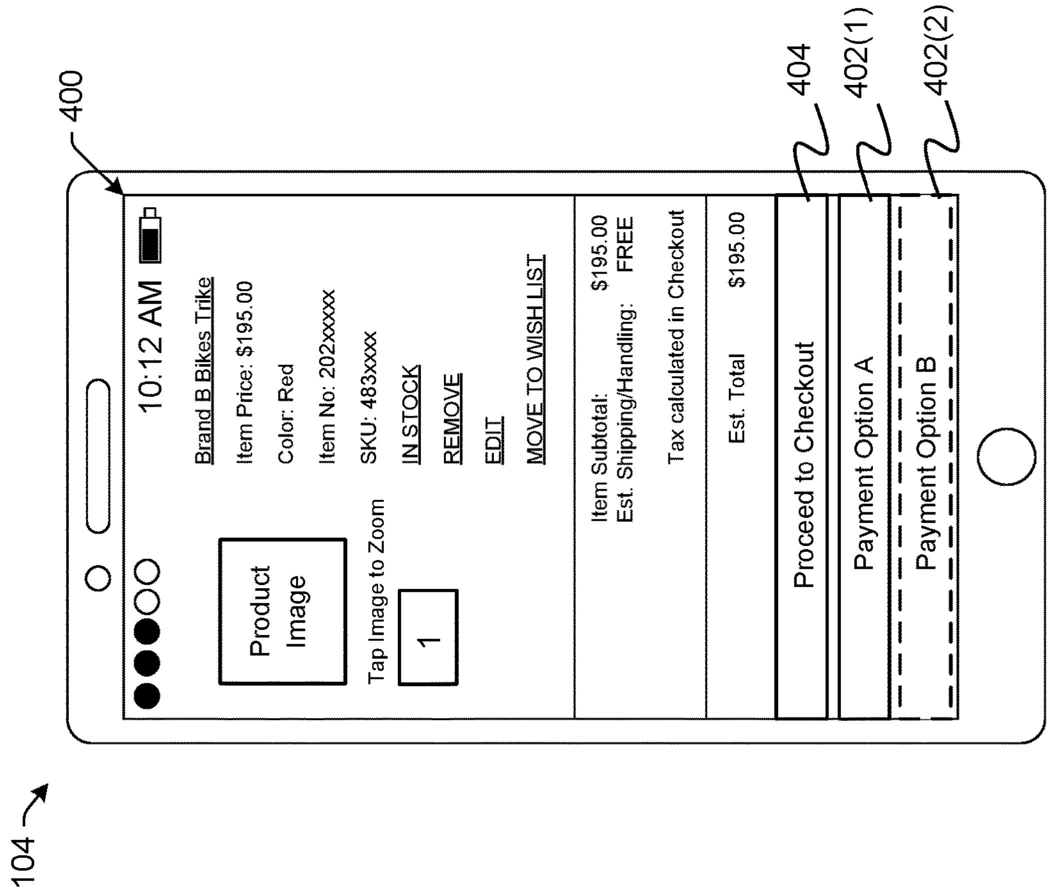
FIG. 4 is an example user interface presenting payment options for purchasing an item, the payment options being based on a risk metric(s), according to an implementation of the present subject matter.

FIG. 4 is an example user interface 400 presenting payment options 402 for purchasing an item, the payment options 402 being based on a risk metric(s), according to an implementation of the present subject matter. The user interface 400 may represent an example of the user interface 122 described with reference to FIG. 1. In an example, the user interface 400 may be displayed on the electronic device 104 of the user 102 in response to the user 102 selecting the entity 312(2) (or tile) in the user interface 302 of FIG. 3. In the example of FIG. 4, the user interface 400 may represent a product detail page associated with the selected entity 312(1), such as a product detail page for the item (e.g., a product with the name "Brand B Bikes Trike"). In addition to presenting details about the item, the user interface 400 may present a checkout element 404 that is selectable to proceed to a checkout process for the item. Furthermore, a first payment option 402(1) (payment option A) may be presented in a selectable state, while a second payment option 402(2) (payment option B) may be presented in an static state such that the user 102 is unable to select the second payment option 402(2) (payment option B). Alternatively, the second payment option 402(2) (payment option B) may not be displayed in the user interface 400. In some examples, second payment option 402(2) (payment option B) is not selectable or not displayed based on a risk metric(s), such as a user risk metric 200 associated with the user 102 and/or a risk metric associated with selected entity 312(2) (e.g., a merchant risk metric 202 associated with Merchant B, the seller of the Brand B Bikes Trike). In other words, a subset of, but not all, available payment options 402 for purchasing the item may be displayed in the user interface 400 of the payment application 106. It is to be appreciated that there may be any suitable number of payment options 402, and that the two payment options 402(1) and 402(2) (payment option A and B) are illustrated merely for example. In some examples, the first payment option 402(1) (payment option A) may be a lower risk payment option than the second payment option 402(2) (payment option B). For instance, the first payment option 402(1) (payment option A) may be a debit card, a registered bank account, cash pay, or the like, while the second payment option 402(2) (payment option B) may be a credit card or a loan (e.g., a buy now, pay later loan) option.

The user interface 400 is provided as an example of a user interface that can be presented to facilitate techniques described herein. User interfaces can present additional or alternative data in additional or alternative configurations. That is, user interface 400 should not be construed as limiting. Further, while FIG. 4 illustrates an example of a dynamic modification that can be made to a payment user interface, additional or alternative modifications can be made dynamically. For example, permissions and/or permitted interactions of the user may be dynamically modified. To illustrate, consider an example where the entity Brand B Bikes Trike presented in the user interface 400 is a high risk entity. In this example, if the user of the electronic device 104 is also determined to be a high risk user, the user may be dynamically restricted to a particular number and/or frequency of transactions and/or to a particular transaction amount in association with the selected entity (e.g., the high risk user may be allowed to conduct no more than two transactions in association with Brand B Bikes Trike). Furthermore, once the user has reached the maximum number and/or frequency of transactions and/or the maximum transaction amount in association with the entity, the payment service computing platform 112 may dynamically exclude the entity from future search results returned to the user. For example, if the user has reached the limit of two transactions in association with Brand B Bikes Trike, and if the user subsequently submits a search query for an item sold by the merchant associated with Brand B Bikes Trike, the search result returned to the user's search query may not include Brand B Bikes Trike due to the transaction limit having been reached, notwithstanding the relevancy of Brand B Bikes Trike to the search query. As another example, the terms of a loan offered to the user of the electronic device 104 may be dynamically modified (e.g., restricted, limited, etc.). For example, if the user is offered a loan (e.g., if Payment Option B in the user interface 400 is a loan) to purchase Brand B Bike Trike, the terms of the loan may be based on the risk metric associated with the user, such as stricter terms that require repayments at a higher amount and/or frequency if the user is determined to be high risk, or less strict terms that require repayments at a lower amount and/or frequency if the user is determined to be low risk.

Figure 5:
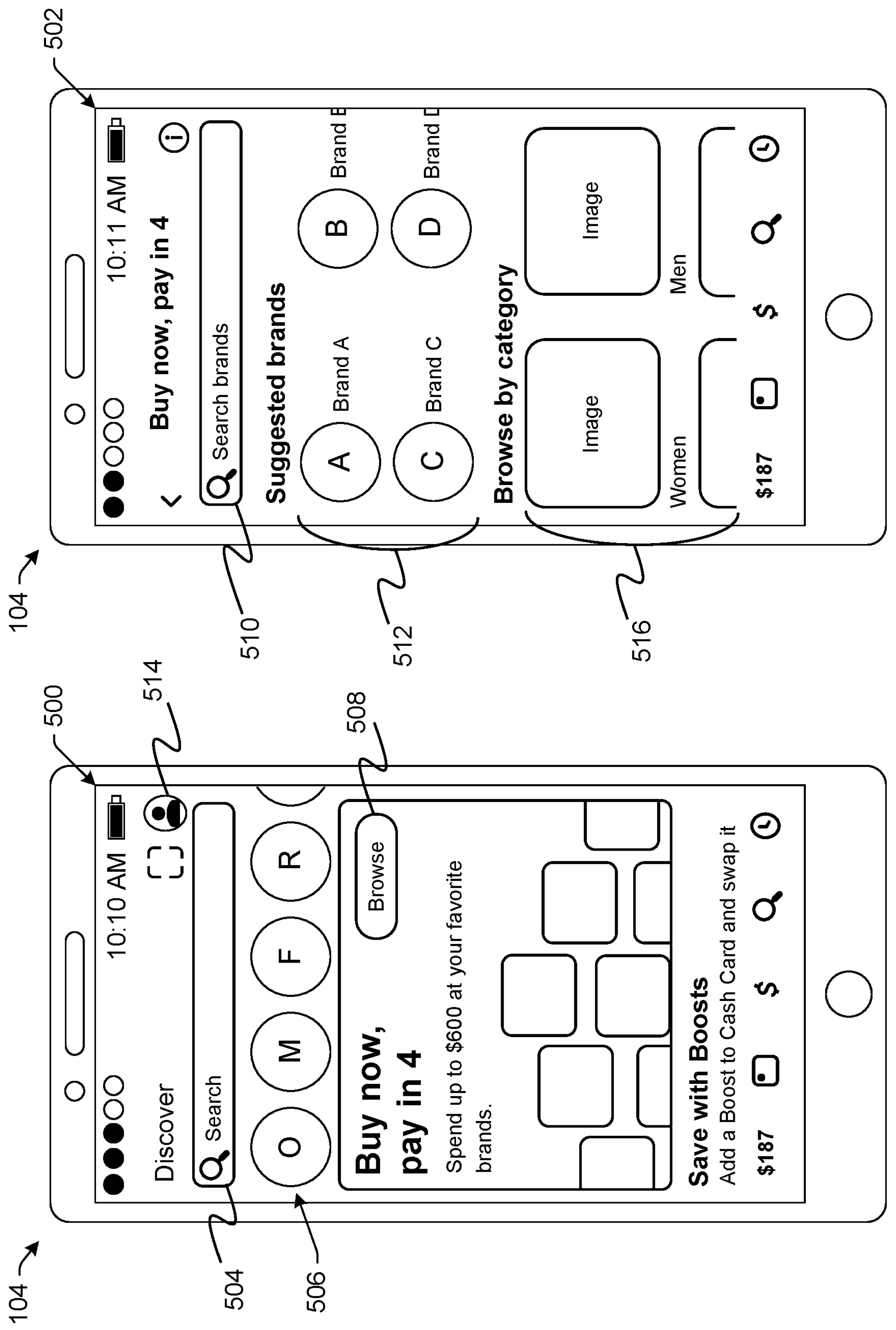
FIG. 5 illustrates example user interfaces from which a user can submit a search query, according to an implementation of the present subject matter.

FIG. 5 illustrates example user interfaces 500 and 502 from which a user 102 can submit a search query 126, according to an implementation of the present subject matter. The user interfaces 500, 502 may represent examples of the user interfaces 122 described with reference to FIG. 1. FIG. 5 shows an electronic device 104 of a user 102 at two instances of time. On the left of FIG. 5, at a first time, such as when the user 102 first opens (or launches) the payment application 106, the electronic device 104 displays a user interface 500 of the payment application 106. The user interface 500 includes one or more interactive elements with which the user 102 can interact (e.g., select via user input). For example, the user interface 500 may include an input element 504 (e.g., a search bar, search field, search entry box, etc.) via which the user 102 can provide user input to submit a search query 126, such as by selecting the input element 504 (e.g., via touch input) and subsequently typing a word or phrase. A virtual keyboard, or other input mechanism, may be presented in response to the user 102 selecting the input element 504, the virtual keyboard enabling the user 102 to type the word or phrase for the search query 126. The input element 504, prior to the user 102 typing the word or phrase, may include text (e.g., "Search . . . ") to inform the user 102 as to what the input element 504 can be used for. By submitting a search query 126 via the input element 504, the user 102 may search for entities, such as other users 102 of the payment service 108, and the search result 124 returned in response to the user's search query 126 may include a list of entities (e.g., other users 102) with whom the user 102 may transact in a peer-to-peer transaction. Accordingly, the list of entities (e.g., other users 102) included in the search result 124 may be generated based at least in part on a likelihood, determined using a portion of the transaction data 128, 130 associated with the entities (e.g., other users 102), that the user 102 will be able to successfully complete a transaction in association with the entities or another criteria or metric. In some examples, as described herein, such entities may be included in the search result 124 based at least in part on a risk metric(s) (e.g., a risk metric of the user 102 and/or risk metrics of the entities (e.g., the other users 102). Additionally, or alternatively, the search result 124 returned to the user 102 may include entities that are personalized or customized for the user 102 who submitted the search query 126 via the input element 504 using the techniques described above. In some examples, portions of lists can be presented via user interfaces.

Other interactive elements presented in the user interface 500 may include a carousel 506 or other arrangement of interactive elements. The interactive elements in the carousel 506 may represent other users 102 of the payment service 108, such as contacts of the user 102 viewing the user interface 500, groups of users for group payment activity (for example splitting), or the like. The carousel 506 may be interacted with by scrolling (e.g., touching and dragging a finger) left or right in order to reveal additional interactive elements of the carousel 506 that are off-screen. Such interactive elements can be configured in additional or alternative configurations, for example, via a drop-down menu or other configuration. The user 102 may interact with (e.g., touch) one of the interactive elements of the carousel 506 to initiate a peer-to-peer transaction with another user 102 of the payment service 108. The user interface 500 may further present an interactive element 508 (e.g., a "Browse" button) to browse and/or search for brands of items that the user 102 may be able to purchase using a loan as a payment option (e.g., a buy now, pay later loan). In response to selecting the interactive element 508, the payment application 106 may cause the user interface 502 to be displayed on the electronic device 104.

On the right of FIG. 5, the user interface 502 is shown, which may be displayed at a second time subsequent to the first time (e.g., after the user 102 has selected the interactive element 508 of the user interface 500). The user interface 502 may include an input element 510 (e.g., a search bar, search field, search entry box, etc.) via which the user 102 can provide user input to submit a search query 126, such as by selecting the input element 510 (e.g., via touch input) and subsequently typing a word or phrase. A virtual keyboard may be presented in response to the user 102 selecting the input element 510, the virtual keyboard enabling the user 102 to type the word or phrase for the search query 126. The input element 510, prior to the user 102 typing the word or phrase, may include text (e.g., "Search brands . . . ") to inform the user 102 as to what types of entities are searchable within the payment application 106. The user interface 502 may further include a list 512 suggested (or featured) entities (e.g., brands). The list 512 of suggested entities may be interacted with by scrolling (e.g., touching and dragging a finger) left or right to reveal additional entities in the list 512. Furthermore, the entities in the list 512 may be presented in the form of interactive elements, such as circular tiles. While the tiles in the list 512 are shown as being circular, it is to be appreciated that the tiles can be presented in other shapes (e.g., rectangular user interface elements, etc.). The tiles may be interacted with (e.g., selected) by the user 102 (e.g., touched with a finger) in order to navigate to another user interface where the user 102 can continue to browse and/or search in association with the selected entity (e.g., brand) and/or complete a transaction in association with the selected entity. Although the list 512 of suggested entities is not generated based on a search query 126, the list 512 may nevertheless be generated based at least in part on a likelihood, determined using a portion of the transaction data 128, 130 associated with the entities, that the user 102 will be able to successfully complete a transaction in association with the entities. For example, the entities (e.g., brands) in the list 512 may be associated with risk metrics, such as merchant risk metrics 202 determined by the risk component 136, and the entities included in the list 512 may be those entities associated with risk metrics that fail to satisfy a threshold (e.g., low risk and/or medium risk entities). For example, a Brand A may be included in the list 512 based at least in part on a machine-trained model(s) 134 classifying the Brand A as a low risk merchant. Likewise, Brand B, Brand C, and Brand D may be included in the list 512 based at least in part on having been classified as low risk or medium risk brands in a similar manner. Accordingly, the user 102 may be shown brands that, based on the risk metrics (e.g., merchant risk metrics 202) associated therewith, increase the likelihood of the user 102 being able to transact in association with the brands, even before the user 102 submits a search query 126.

In some examples, the user interface 500 may present an icon 514 indicating that the user 102 is logged into the payment application 106. After logging into the payment application 106, the user 102 can be identified by the payment service computing platform 112, and, hence, the payment service computing platform 112 may be able to determine a user risk metric and/or personalize the list 512 for the identified user 102, as described herein. Thus, even before a search query 126 is submitted by the user 102, the list 512 of suggested entities presented via the user interface 502 of the payment application 106 may be ranked (e.g., by arranging the circular tiles in the list 512 in a particular order) based on transaction data 128, 130, such as to increase the likelihood of the user 102 being able to transact in association with the entities in the list 512, and/or to surface entities that are relevant to the user 102 based on user preferences, search history, purchase history, or the like. In the example of FIG. 5, the list 512 may be horizontally scrollable (e.g., left-to-right and/or right-to-left), which can mean that the leftmost entities in the list 512 are the highest-ranked entities (or tiles), and lower-ranked entities (or tiles) can be revealed when the user 102 scrolls the list 512 in a leftward direction. The user interface 502 is also shown as including a "Browse by category" section 516 where the user 102 can browse categories of items (e.g., products). The section 516 may be interacted with by scrolling (e.g., touching and dragging a finger) up or down to reveal additional categories of items. Furthermore, the categories in section 516 may be presented in the form of interactive elements, such as tiles including an image of the type of category (e.g., Women, Men, etc.). The tiles in section 516 may be interacted with (e.g., selected) by the user 102 (e.g., touched with a finger) in order to navigate to another user interface where the user 102 can continue to browse and/or search in association with the selected category, which may surface entities (e.g., merchants 110, items, etc.) based at least in part on a likelihood, determined using a portion of the transaction data 128, 130 associated with the entities, that the user 102 will be able to successfully complete a transaction in association with the entities, as described herein, and such entities may be surfaced prior to the user 102 submitting a search query 126.

If the user 102 were to submit a search query 126 by typing a word or phrase into the input element 510 (e.g., search bar), the payment service computing platform 112 may generate a list of entities (e.g., merchants 110, items, etc.), and the electronic device 104 may display a user interface of the payment application 106 (e.g., user interface 302) that presents at least a portion of the list as a search result 124 to the search query 126. Such a list of entities generated as a search result 124 would be relevant to the search query 126, and the list would be generated based at least in part on a likelihood, determined using a portion of the transaction data 128, 130 associated with the entities, that the user 102 will be able to successfully complete a transaction in association with the entities, as described in detail elsewhere herein. Accordingly, FIG. 5 illustrates user interfaces 500, 502 from which a user 102 may browse entities and/or submit a search query 126 for entities, according to an implementation of the present subject matter.

The user interfaces 500 and 502 are provided as examples of user interfaces that can be presented to facilitate techniques described herein. User interfaces can present additional or alternative data in additional or alternative configurations. That is, user interfaces 500 and 502 should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
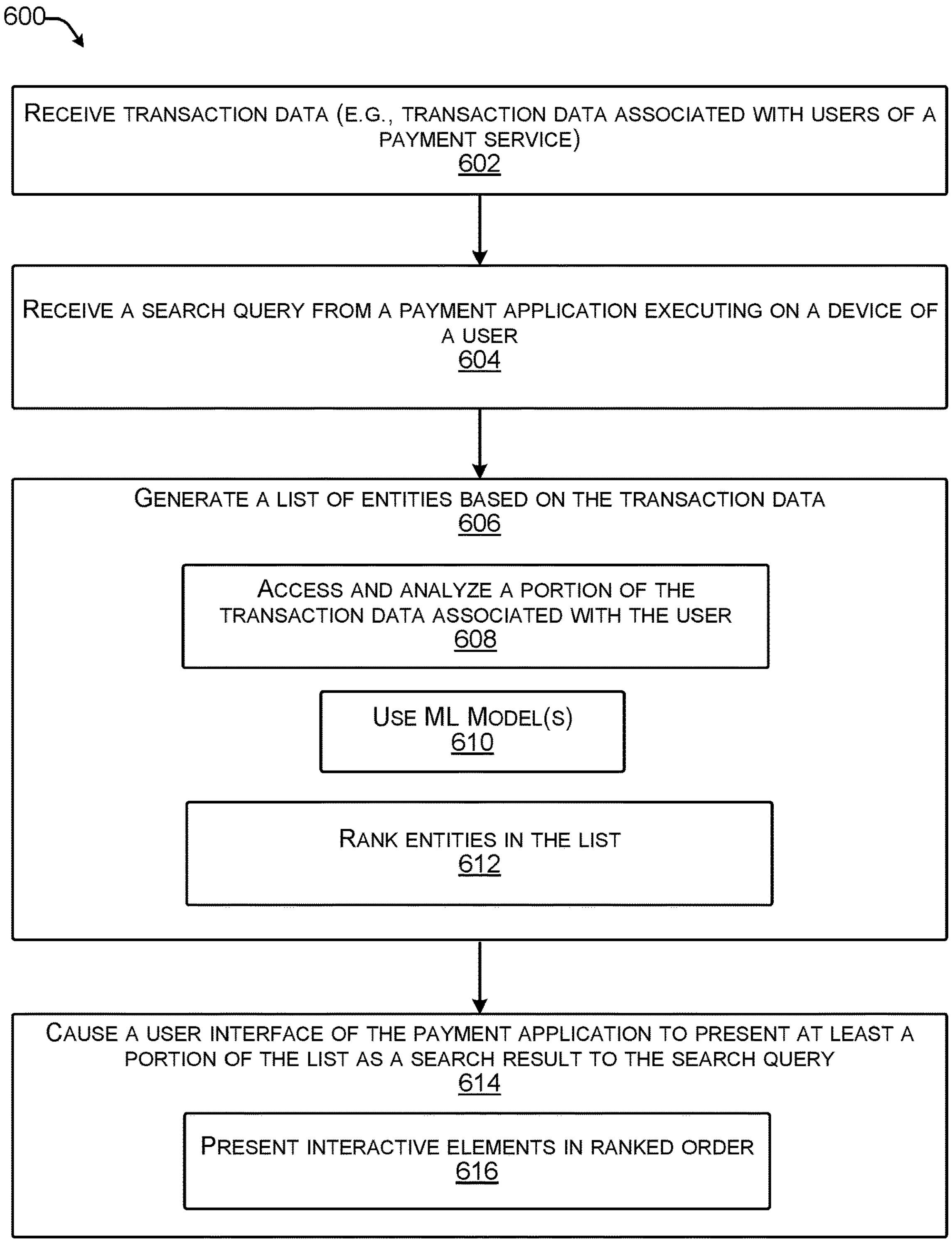
FIG. 6 is an example process for using transaction data, interaction data, or the like to generate search results, according to an implementation of the present subject matter.

FIG. 6 is an example process 600 for using transaction data, interaction data, or the like to generate search results, according to an implementation of the present subject matter. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 600. The process 600 can be implemented by a system including one or more processors and memory storing computer-executable instructions to cause the one or more processors to perform the process 600. In some examples, the process 600 can be implemented by a processing device(s) 118 (e.g., server(s)) of the payment service computing platform 112. For discussion purposes, the process 600 is described with reference to the previous figures.

At 602, transaction data 128, 130 is received. In some examples, a payment service computing platform 112 associated with a payment service 108 (e.g., a processor(s) thereof) may receive the transaction data 128, 130 at block 602. In some examples, the transaction data received at block 602 includes transaction data 128 associated with users 102 of the payment service 108. In some examples, the transaction data received at block 602 may include payment data indicating payments made by the users 102 using the payment application 106, a number of transactions associated with individual users 102, transaction amounts (e.g., average spend of transactions), transaction frequencies, transactions times, payments made by the individual users 102 over a period of time (e.g., the past 180 days), lending data indicating loans made to the individual users 102, as well as number of loans, loan amounts, loan frequencies, etc., repayment data indicating repayments made by the individual users 102 to a lender, as well as repayment amounts, a number of late payments, late payments made by the individual users 102 over a period of time (e.g., the past 180 days), payment instrument data indicating payment instrument used (e.g., debit, credit, single-use), order data indicating items purchased, orders placed by the individual users 102 over a period of time (e.g., the past 180 days), a length of time since the individual users placed a first order with the payment service 108 (e.g., user tenure), investment data, or the like. In some examples, the transaction data received at block 602 may include merchant transaction data 130 indicating merchant payment performance, chargeback rates, revenue rates, conversion rates, authorization rates (e.g., which may indicate a likelihood of a transaction succeeding with the merchant 110), capture rates, commission rates, a number of declines, chargebacks, etc., merchant category code (MCC), payments received by the individual merchant 110 via the payment service 108, a number of transactions associated with the individual merchants 110 (e.g., average transaction volume), transaction amounts (e.g., average spend of transactions, average transaction amount, etc.), transaction frequencies, transactions times, payments received by the individual merchants 110 over a period of time (e.g., the past 180 days), payment instrument used (e.g., debit, credit, single-use), inventory data indicating items available for sale, items available in inventory, order data indicating orders fulfilled by the individual merchants 110 over a period of time (e.g., the past 180 days), a length of time since the individual merchants 110 fulfilled a first order with the payment service 108 (e.g., merchant tenure), or the like.

At 604, a search query 126 is received from a payment application 106 associated with the payment service 108 and executing on a device 104 of a user 102. In some examples, the payment service computing platform 112 (e.g., a processor(s) thereof) may receive the search query 126 from the user 102 at block 604. In some examples, the search query 126 includes a user identifier (e.g., a UUID) associated with the user 102. For example, the user identifier can be sent via an application programming interface (API) to the search service 132 in the search query 126. In other examples, the user 102 can be identified based on credentials used to login to the payment application 106, which may have been received at an earlier time, prior to receiving the search query 126 at block 604. In other examples, the user 102 may remain unidentified.

At 606, a list 308 of entities may be generated based at least in part on the transaction data 128, 130. In some examples, the payment service computing platform 112 (e.g., a processor(s) thereof) may generate the list 308 at block 606. The entities in the list 308 may include one or more of a merchant 110 (e.g., a brand, store, business, etc.), another user 102 (e.g., another person), a group of users 102, an item (e.g., a good, service, etc.), and/or an incentive (e.g., a discount, reward, kickback, etc.). In some examples, the entities in the list 308 may include events (e.g., fundraisers), and/or any other suitable entity that is searchable and displayable in a search result 124 to a search query 126. In some examples, the list 308 is generated at block 606 based at least in part on a likelihood, determined using a portion of the transaction data 128, 130 associated with the entities, that the user 102 will be able to successfully complete a transaction in association with the entities. A transaction with a merchant 110, for example, may be successful if the transaction is authorized during a checkout process, and the transaction with the merchant 110 may be unsuccessful if the transaction is declined during the checkout process. A transaction with another user 102, for example, may be successful if funds are transferred between the user and the other user in a peer-to-peer transaction, and the transaction with the other user 102 may be unsuccessful if the funds are not transferred between the user and the other user in the peer-to-peer transaction. A transaction with a group of users, for example, may be successful if funds are transferred between the user and a full set of user in the group, and the transaction with the group of users 102 may be unsuccessful if the funds are not transferred to at least one user in the group. A transaction for an item, for example, may be successful if the transaction is authorized during a checkout process, and the transaction for the item may be unsuccessful if the transaction is declined during the checkout process. A transaction associated with an incentive, for example, may be successful if the user receives the incentive, and the transaction associated with the incentive may be unsuccessful if the user does not receive the incentive. In some examples, the aforementioned portion of the transaction data 128, 130 may be a second portion of the transaction data 128, 130, and the process 600 may include accessing and analyzing a first portion of the transaction data 128 associated with the user 102 at block 608. In some examples, at block 610, the list 308 may be generated using a machine-trained model(s) 134 to analyze the first portion of the transaction data 128 associated with the user 102. In some examples, at block 612, the entities in the list 308 are ranked. The ranking at block 612 can be based at least in part on the likelihood, determined using the (second) portion of the transaction data 128, 130 associated with the entities, that the user 102 will be able to successfully complete a transaction in association with the entities (e.g., entities that are more likely to result in a successful transaction can be ranked higher in the list 308). The ranking at block 612 can be based on user data (e.g., user transaction data 128) and on merchant data (e.g., merchant transaction data 130), which may be accessed by the payment service computing platform 112 (e.g., from the datastore(s) 120). That is, the payment service computing platform 112 may access user data and/or merchant data and may rank the entities in the list 308 based on the accessed data.

In some examples, the ranking at block 612 can be based on other criteria, such as personalization (e.g., rank the entities based on relevancy to the user 102), which may result in generating a personalized list of entities at block 606. For example, the payment service computing platform 112 may access user data associated with the user 102 (e.g., from the data store(s) 120), and rank the entities in the list 308 based at least in part on the accessed user data to generate a personalized list of entities at block 606. In some examples, the ranking performed at block 612 to generate a personalized list of entities for the user 102 may utilize a machine-trained model(s) 134 (e.g., the personalization model(s) 228) to analyze the user data associated with the user 102. In some examples, the user data accessed for personalizing the list 308 may include transaction data 128, 130 (e.g., purchase history), as well as profile data (e.g., user profile data, merchant profile data, etc.), preference data user, search history data, external data (e.g., from social networks), interaction data (e.g., content accessed, viewed, clicked on, etc.), investing data (e.g., stocks purchased, etc.).

At 614, a user interface 302 of the payment application 106 may be caused to present at least a portion of the list 308 of entities as a search result 124 to the search query 126. An example of such a list 308(3) is shown in FIG. 3 in the user interface 302. In some examples, the payment service computing platform 112 (e.g., a processor(s) thereof) may cause the user interface 302 to present at least the portion of the list 308 at block 614. In some examples, at least the portion of the list 308 may be presented as interactive elements (e.g., tiles representing the entities in the list 308) that are in a ranked order based on the ranking at block 612. With the process 600, a user 102 who submits the search query 126 is likely to be able to successfully complete a transaction in association with a selected entity from the list 308 returned as the search result 124 to the user's search query 126. Furthermore, if personalization is implemented to rank the list, the portion of the list 308 presented in the user interface 302 may be a personalized list with entities that are also relevant to the user 102 (e.g., based on user interests, predilections, preferences, etc.).

Figure 7:
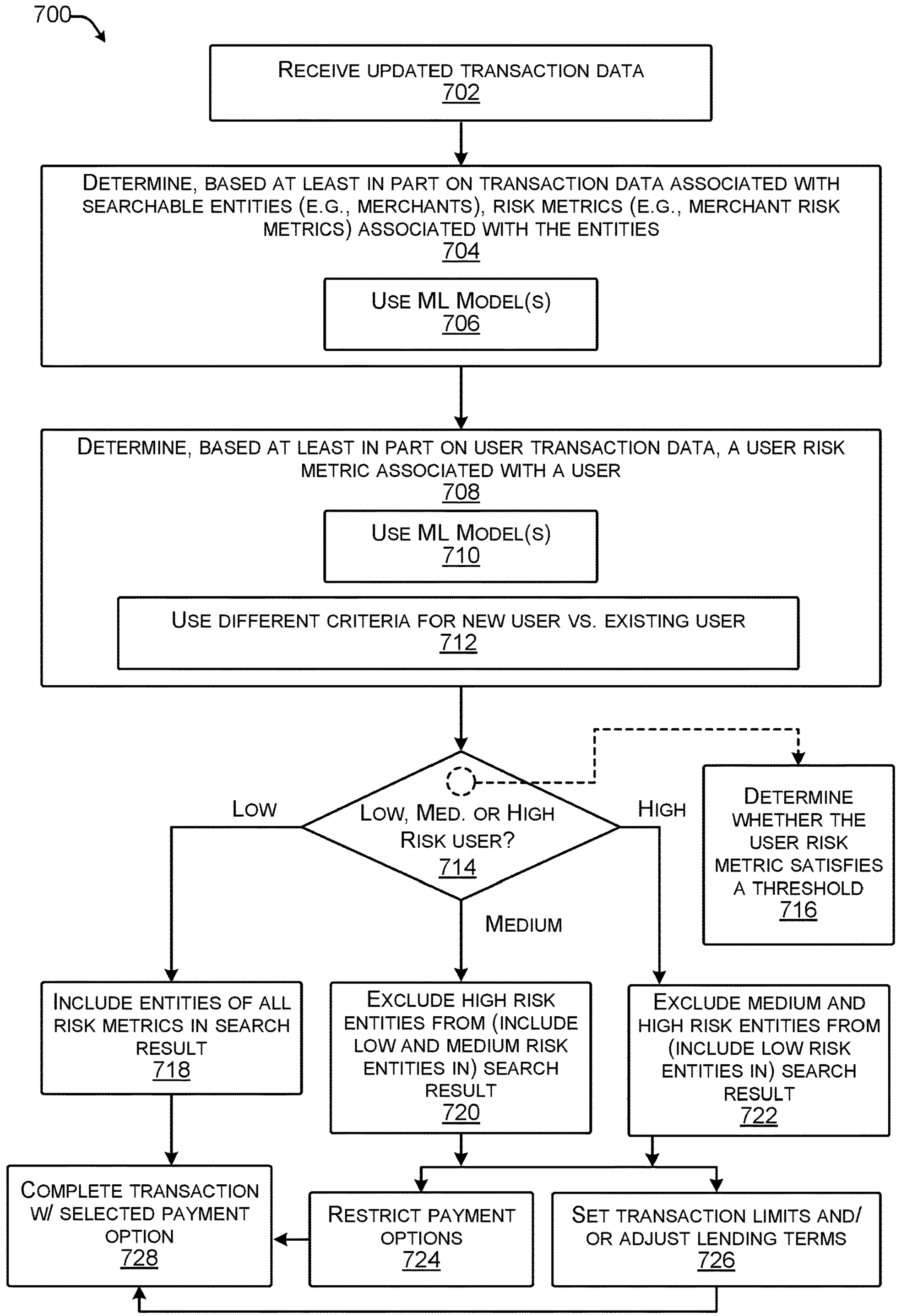
FIG. 7 is an example process for using risk to, among other things, generate a search result, according to an implementation of the present subject matter.

FIG. 7 is an example process 700 for using risk to, among other things, generate a search result, according to an implementation of the present subject matter. The process 700 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. The order in which the operations are described is not intended to be construed as a limitation, and any number of the described blocks can be combined in any order and/or in parallel to implement the process 700. The process 700 can be implemented by a system including one or more processors and memory storing computer-executable instructions to cause the one or more processors to perform the process 700. In some examples, the process 700 can be implemented by a processing device(s) 118 (e.g., server(s)) of the payment service computing platform 112. For discussion purposes, the process 700 is described with reference to the previous figures.

At 702, updated transaction data 128, 130 is received. In some examples, a payment service computing platform 112 associated with a payment service 108 (e.g., a processor(s) thereof) may receive the updated transaction data 128, 130 at block 702. In some examples, the transaction data received at block 702 is similar to the transaction data described above with respect to block 602 of the process 600.

At 704, risk metrics associated with searchable entities (e.g., merchants 110, items, etc.) are determined based on transaction data 128, 130 associated with the searchable entities. In some examples, the payment service computing platform 112 (e.g., a processor(s) thereof) may determine the risk metrics at block 704. In an example, the risk metrics determined at block 704 may be, or include, merchant risk metrics 202 associated with merchants 110. The risk metrics may be determined, at block 706, using a machine-trained model(s) 134, in some examples. For example, a machine-trained model(s) 134 may be used to analyze a portion of the transaction data 128, 130 associated with the searchable entities (e.g., merchants 110, items, etc.). In other examples, a rules-based approach may be used to determine the risk metrics. In some examples, entities, such as merchants 110, may be classified as high risk, medium risk, or low risk. For example, a merchant 110 associated with a high chargeback rate may be classified as a high risk merchant 110. Any of the signals, and/or data used to generate the signals, described with reference to FIG. 2, above, may be used to determine the risk metrics (e.g., merchant risk metrics 202) at block 704.

At 708, a risk metric associated with a user 102 (e.g., a user risk metric 200) is determined based on user transaction data 128 associated with the user 102. In some examples, the payment service computing platform 112 (e.g., a processor(s) thereof) may determine the user risk metric 200 at block 708. The user risk metric 200 may be determined, at block 710, using a machine-trained model(s) 134 (e.g., the risk model(s) 204), in some examples. For example, a machine-trained model(s) 134 may be used to analyze a portion of the transaction data 128 associated with the user 102. In other examples, a rules-based approach may be used to determine the user risk metric 200. Any of the signals, and/or data used to generate the signals, described with reference to FIG. 2, above, may be used to determine the user risk metric 200 at block 708. In some examples, at block 712, the payment service computing platform 112 may utilize different criteria for new users verses existing users in determining the user risk metric 200. Additionally, or alternatively, data from one or more existing users can be used to make intelligent recommendation and/or determinations (e.g., risk metric determinations) for a new user based on a similarity of the new user and the existing user(s) (e.g., similar demographics, location, etc.). A user 102 may be classified as a new user or an existing user in various ways, such as based on the user's tenure (e.g., a length of time since the user 102 placed a first order with the payment service 108). For example, if the user's tenure is less than or equal to a threshold length of time (e.g., 14 days), the user 102 may be classified as a new user, otherwise the user 102 may be classified as an existing user. In some examples, the user 102 may be classified as one of multiple classes (e.g., risk classes). The multiple risk classes can include at least a first risk class or a second risk class that is different than the first risk class. In some examples, the first risk class may represent a low risk class and the second risk class may represent a high risk class. In some examples, the multiple risk classes may include a low risk class, a high risk class, and one or more intermediate risk classes, such as a medium risk class, but it is to be appreciated that risk may be assessed and/or determined at any suitable level of granularity. Accordingly, a risk metric that is determined for a user is not limited to one of high risk, medium risk, or low risk. For example, a risk metric may be determined as a score (e.g., a score within a range of zero to one, where the score can be calculated at any suitable number of significant digits, such as a score of 0.05, 0.4, 0.757, etc.). In some examples, a new user may be classified as a high risk user if (i) the user has a white page identity check score greater than or equal to 295, or (ii) the user's tenure is equal to zero (e.g., the user 102 placed his/her first order with the payment service 108 within the past 24 hours), the user 102 has a white page identity check score less than 295, and the state match signal for the user 102 indicates that there is no state match (e.g., an area code of the user's phone number (or another suitable location indicator, such as an IP address, GPS coordinates, etc.) is inconsistent with (e.g., does not match) a shipping address(es) that the user 102 uses when placing orders for items using the payment service 108). A new user may be classified as medium risk user if (i) the user's tenure is equal to zero, the user 102 has a white page identity check score less than 295, and the state match signal for the user 102 indicates a state match, or (ii) the user's tenure is equal to or greater than one (e.g., at least 24 hours has lapsed since the user placed his/her first order with the payment service 108) and the user 102 has a white page identity check score within a range of 170 to 295 (inclusive). A new user may be classified as a low risk user if the user's tenure is equal to or greater than one and the user 102 has a white page identity check score less than or equal to 170. Meanwhile, an existing user may be classified as a high risk user if the user 102 has not placed an order using the payment service 108 in the past 180 days. An existing user may be classified as a medium risk user if (i) the user's tenure is less than or equal to 45 days (e.g., no more than 45 days have lapsed since the user 102 placed his/her first order), or (ii) the user's tenure is less than or equal to 365 days and the user 102 has made at least one late payment in the past 180 days. An existing user may be classified as a low risk user if (i) the user's tenure is greater than or equal to 366 days, or (ii) the user's tenure is less than or equal to 365 days and the user 102 has not made a late payment in the past 180 days. It is to be appreciated that these criteria for classifying a user (new or existing) by risk are merely example ways of classifying a user as high, medium, or low risk, and that any suitable technique for determining a user risk metric 200, as described herein, may be utilized at block 708.

It is to be appreciated that the risk metric(s) determined at block 704 and/or block 708 may be determined in response to receiving the updated transaction data at block 702. In other words, the payment service computing platform 112 may monitor for the receipt of the updated transaction data 702 at block 702 before executing machine-trained model(s) 134 to determine the risk metric(s) at block 704 and/or block 708, which helps to conserve computing resources by utilizing machine-trained model(s) 134 as-needed (e.g., in response to receiving the updated transaction data at block 702). In other examples, the risk metric(s) determined periodically at block 704 and/or block 708, and/or in response to any other cue(s)/event(s). It is also to be appreciated that the risk metric(s) determined at block 704 and/or block 708 may be determined prior to receiving a search query 126 submitted by a user 102. Because it is both computationally intensive and time consuming to execute machine-trained models at runtime, this offline utilization of machine-trained model(s) 134 to determine a risk metric(s) associated with a user 102 and/or with entities (e.g., merchants 110) prior to receiving a search query 126 from the user 102 allows for having the risk metric(s) at the ready, as needed, at a time at which a search query 126 is received from the user 102. This can also drive more accurate search results and it allows for returning search results with lower latency, as compared to conventional search techniques that utilize machine learning.

At 714, a determination is made as to whether the user 102 is classified as one of multiple classes (e.g., a low risk user, a medium risk user, or a high risk user). In some examples, the payment service computing platform 112 (e.g., a processor(s) thereof) may determine whether the user 102 is classified as a low risk user, a medium risk user, or a high risk user at block 714. In some examples, this determination at block 714 involves determining, at 716, whether the user risk metric 200 satisfies a threshold. The threshold evaluated at block 716 may be one of multiple thresholds including a first (e.g., low risk) threshold, second (e.g., medium risk) threshold, and/or third (e.g., high risk) threshold, where the first/low risk threshold is less than the second/medium risk threshold, and the second/medium risk threshold is less than the third/high risk threshold. Alternatively, other thresholds may be evaluated at block 716 to determine which level of risk the user 102 has been classified.

At block 718, 720, or 722, the search results 124 to the user's search query 126 is generated based at least in part on the user risk metric 200 and the risk metrics associated with the searchable entities (e.g., merchant risk metrics 202) determined at blocks 704 and 708, respectively. In other words, at least a portion of a list 308 of entities that is to be displayed via the user interface of the payment application 106 (e.g., at block 614 of the process 600) is generated based at least in part on the user risk metric 200 and the entity risk metrics (e.g., merchant risk metrics 202) associated with the searchable entities. For example, the search service 132 may return a list of blocked/ineligible entities (e.g., merchants 110) and may exclude (e.g., filter out) the blocked/ineligible entities from the search result 124. The search service 132 may additionally, or alternatively, return a list of entities to be displayed in the search result 124. At 718, for example, if the user 102 is classified as a low risk user (e.g., if the payment service computing platform 112 determines that the user risk metric does not (e.g., fails to) satisfy a threshold, such as a medium risk threshold), the entities in the list 308 returned as a search result 124 to the user's search query 126 may include entities (e.g., merchants 110) associated with entity risk metrics (e.g., merchant risk metrics 202) that satisfy another threshold(s), such as a medium risk threshold and/or a high risk threshold). For example, a low risk user may be shown entities (e.g., merchants 110) of all risk metrics (or tiers) in a search result 124. Said another way, entities may not be filtered out, or hidden, for a low risk user.

At 720, as another example, if the user 102 is classified as a medium risk user (e.g., if the payment service computing platform 112 determines that the user risk metric 200 satisfies a threshold, such as a medium risk threshold), the entities in the list 308 returned as a search result 124 to the user's search query 126 may include entities (e.g., merchants 110) associated with entity risk metrics (e.g., merchant risk metrics 202) that do not (e.g., fail to) satisfy another threshold, such as a high risk threshold). For example, a medium risk user may be shown low risk and medium risk entities (e.g., merchants 110) in a search result 124, but high risk entities (e.g., merchants 110) may be excluded from the search result 124. Said another way, high risk entities (e.g., merchants 110) may be filtered out, or hidden, for a medium risk user. In some examples, medium risk entities may be filtered out, or hidden, for a medium risk user.

At 722, as another example, if the user 102 is classified as a high risk user (e.g., if the payment service computing platform 112 determines that the user risk metric 200 satisfies a threshold, such as a high risk threshold), the entities in the list 308 returned as a search result 124 to the user's search query 126 may include entities (e.g., merchants 110) associated with entity risk metrics (e.g., merchant risk metrics 202) that do not (e.g., fail to) satisfy another threshold, such as a medium risk threshold). For example, a high risk user may be shown low risk entities (e.g., merchants 110) in a search result 124, but medium risk and high risk entities (e.g., merchants 110) may be excluded from the search result 124. Said another way, medium risk and high risk entities (e.g., merchants 110) may be filtered out, or hidden, for a high risk user. In some examples, medium risk entities may not be filtered out, or hidden, for a high risk user.

At 724, payment options 402 are restricted (and the restricted payment options 402 are displayed via a user interface 400 of the payment application 106) based at least in part on a risk metric(s), such as a user risk metric 200 determined at block 708 and/or an entity risk metric (e.g., a merchant risk metric 202) determined at block 704 for a selected entity. In some examples, the payment service computing platform 112 (e.g., a processor(s) thereof) may restrict the payment options at block 724. An example of restricting payment options 402 for a user 102 is shown in FIG. 4. For example, at block 724, the payment service computing platform 112 may receive a first indication of a selection of an entity in a list 308 of entities returned as a search result 124 to the user's search query 126, and may cause a second user interface 400 of the payment application 106 to display a subset of available payment options 402 for purchasing an item from the entity selected by the user 102, wherein the subset is determined from a full set of payment options based at least in part on a risk metric(s) (e.g., the user risk metric and/or an entity risk metric(s)). "Displaying a subset of available payment options," as used herein, can mean refraining from displaying one or more available payment options and/or displaying multiple available payment options with at least one of the payment options displayed in a state where the at least one payment option cannot be selected by the user 102 (e.g., displaying an "unselectable" payment option 402). For example, if two payment options, payment option A and payment option B, are available payment options 402, payment option A may be displayed without displaying payment option B, or with payment option B displayed in a state where payment option B cannot be selected by the user 102. In the process 700, this type of payment option restriction may be implemented for a medium risk user and/or a high risk user. For example, if the user 102 is classified as a high risk user, a subset of available payment options 402 (e.g., a debit card, cash pay, etc.) may be displayed during a checkout process, while other "available" payment options 402 may not be displayed or may be displayed in a non-interactable state for the high risk user, as depicted in the example of FIG. 4. By contrast, the payment service computing platform 112 may cause a full suite of available payment options 402 to be presented to a low risk user in order for the low risk user to select a payment option 402 to purchase an item from a selected entity.

At 726, transaction limits are set and/or lending terms are adjusted for a user 102 based at least in part on a risk metric(s), such as a user risk metric 200 determined at block 708 and/or an entity risk metric (e.g., a merchant risk metric 202) determined at block 704 for the selected entity. In some examples, the payment service computing platform 112 (e.g., a processor(s) thereof) may set transaction limits and/or adjust lending terms at block 726. For example, if the user risk metric 200 determined at block 708 satisfies a threshold, such as a medium risk threshold and/or a high risk threshold, the payment service computing platform 112, at block 726, may allow the user 102 to conduct a number or a frequency of transactions that does not exceed a particular number of transactions with one or more entities in the list 308 (returned as a search result 124) that are associated with entity risk metrics (e.g., merchant risk metrics 202) that satisfy another threshold, such as medium risk threshold and/or a high risk threshold. Alternatively, the payment service computing platform 112, at block 726, may allow the user to conduct transactions with the one or more entities (e.g., medium risk and/or high risk entities) at a transaction amount that does not exceed a particular transaction amount. In other words, a medium risk or high risk user may be limited in terms of the transactions that the user 102 is allowed to make with entities (e.g., merchants 110) of a particular risk level (e.g., medium risk and/or high risk entities). As another example, lending terms may be adjusted for such a user 102, such as by adjusting the repayment rate and/or amount for a user 102 who is offered a loan (e.g., a buy now, pay later loan) as a payment option for purchasing an item.

At 728, a transaction is completed for an item using a selected payment option. In some examples, the payment service computing platform 112 (e.g., a processor(s) thereof) may complete a transaction at block 728. For example, the payment service computing platform 112 may receive an indication of a selection of a payment option 402 displayed via a user interface of the payment application 106. Following block 718, these payment options 402 may not be restricted. Following block 724, however, the selected payment option 402 may be one of a subset of available payment options 402 that have been restricted for a medium risk user or a high risk user. The payment service computing platform 112 may then complete a transaction for the item using the selected payment option. In addition, following block 726, the transaction may be completed at block 728 in accordance with a transaction limit set at block 726 and/or with lending terms adjusted at block 726.

The assessment of risk as low, medium, or high risk is provided as an example in the process 700 of FIG. 7 to facilitate techniques described herein. Alternative classifications, groupings, and/or signals can be used. That is, the low, medium, or high risk of the user determined at block 714 should not be construed as limiting. For example, the determination at block 714 may be one of low risk or high risk (e.g., medium risk may not be a possible class), or atop number of lowest risk may be determined at block 714. Moreover, while the techniques and processes (e.g., the process 700) described herein are described as including or excluding certain entities from a search result 124, in some examples, different thresholds can be used and/or a list of entities generated as a search result 124 can be more inclusive or less inclusive than as described herein. For instance, at block 722, in some examples, medium risk entities and/or high risk entities may be included in the search result 124. In these examples, the included medium risk entities and/or high risk entities may be deprioritized (e.g., ranked lower than low risk entities), and/or payment options, transaction limits, and/or lending terms may be more restrictive for the medium risk entities and/or high risk entities included in the search result 124.

Figure 8:
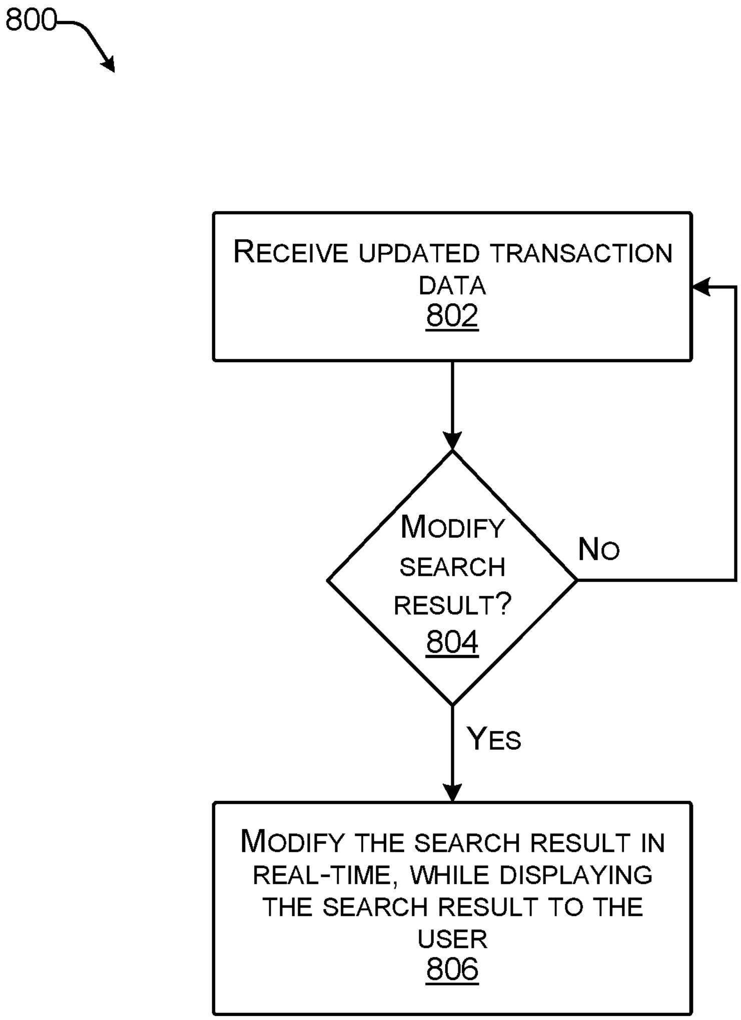
FIG. 8 is an example process for modifying a search result in real-time, or near real-time as updated transaction data is received, according to an implementation of the present subject matter.

FIG. 8 is an example process 800 for modifying a search result in real-time, or near real-time as updated transaction data is received, according to an implementation of the present subject matter. The process 800 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. The order in which the operations are described is not intended to be construed as a limitation, and any number of the described blocks can be combined in any order and/or in parallel to implement the process 800. The process 800 can be implemented by a system including one or more processors and memory storing computer-executable instructions to cause the one or more processors to perform the process 700. In some examples, the process 800 can be implemented by a processing device(s) 118 (e.g., server(s)) of the payment service computing platform 112. For discussion purposes, the process 800 is described with reference to the previous figures.

At 802, updated transaction data 128, 130 associated with one or more entities in a list 308 of entities returned as a search result 124 to a user's search query 126 is received. In some examples, a payment service computing platform 112 associated with a payment service 108 (e.g., a processor(s) thereof) may receive the updated transaction data 128, 130 at block 802. In an example, a merchant 110 listed in a user's search result 124 may complete one or more transactions with one or more other users 102 of the payment service 108 while a search result 124 is being displayed to a first user 102.

At 804, a determination is made as to whether to modify the search result 124 being displayed to the user 102. For example, if the one or more transactions that caused the receipt of the updated transaction data at block 802 affect the merchant's 110 risk metric (either negatively or positively), the ranked position of the merchant 110 within a list of merchants 110 may change (e.g., the merchant 110 may be up-ranked or down-ranked). However, if the updated transaction data does not warrant a change to the search result 124, the process 800 may follow the NO route from block 804 to block 802 until more updated transaction data is received. If the payment service computing platform 112 determines to modify the search result 124 being displayed to the user 102, the process 800 may follow the YES route from block 804 to block 806.

At 806, the user interface of the payment application 106 that is displaying the search result 124 may be modified. For example, the payment service computing platform 112 may cause the user interface to modify at least the portion of the list 308 of entities presented as the search result 124 based at least in part on the updated transaction data received at block 802. For example, an entity 312 that is being presented in the list 308(3) of entities via the user interface 302 may disappear from the user interface 302 and/or the order and/or arrangement of the entities 312 in the list 308(3) may change in real-time, or near real-time, as the list 308(3) is being presented via the user interface 302.

Figure 9:
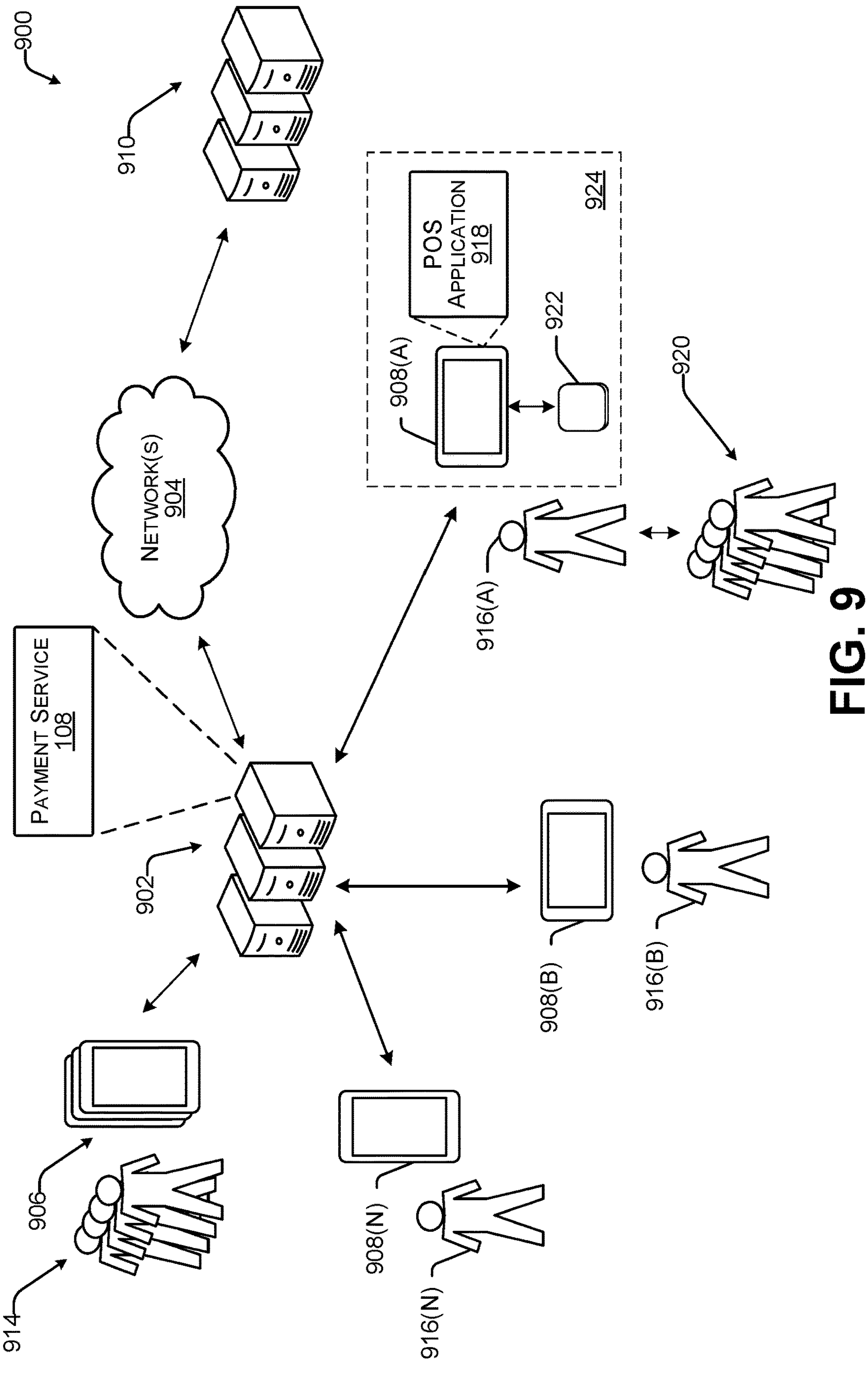
FIG. 9 is an example environment for performing techniques described herein.

FIG. 9 is an example environment 900 for performing techniques described herein. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902.

For example, the server(s) 902 may be the same as or similar to the payment service computing platform 112 and/or the processing device(s) 118 (e.g., server(s)) introduced in FIG. 1, and the server(s) 902 may implement the payment service 108, which may include the search service 132 including the trained machine learning model(s) 134, the risk component 136, and/or the personalization component 138, as described herein. Furthermore, the network(s) 904 may be the same as or similar to the network(s) 116 introduced in FIG. 1.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user devices 906 (and in some examples, the merchant devices 908) may be the same as or similar to the electronic devices 104 introduced in FIG. 1. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). The users 914 may be the same as or similar to the users 102 introduced in FIG. 1, and the merchants 916 may be the same as or similar to the merchants 110 introduced in FIG. 1. In an example, the merchants 916 can operate respective merchant devices 908, which can be user devices 906 configured for use by merchants 916. In some examples, the merchant devices 908 may be the same as or similar to the merchant devices 114 introduced in FIG. 1. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., pop-up shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

In accordance with the examples described herein, the server(s) 902 may use transaction data 128, 130 to rank search results. For instance, the server(s) 902 may receive transaction data 128, 130 associated with users 914 of a payment service 108, and may receive a search query 126 from a payment application 106 associated with the payment service 108 and executing on a device 906 of a user 914. The server(s) 902 may then generate a list of entities based at least in part on a likelihood, determined using a portion of the transaction data 128, 130 associated with the entities, that the user 914 will be able to successfully complete a transaction in association with the entities, and may cause a user interface 122 of the payment application 106 to present at least a portion of the list of entities as a search result 124 to the search query 126. In this example, the entities in the list generated by the server(s) 902 may include merchants 916.

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth®, BLE, and so on. Additional details are described below with reference to FIG. 9. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as “secondary” terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the “payment service providers” can be acquiring banks (“acquirer”), issuing banks (“issuer”), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 916(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
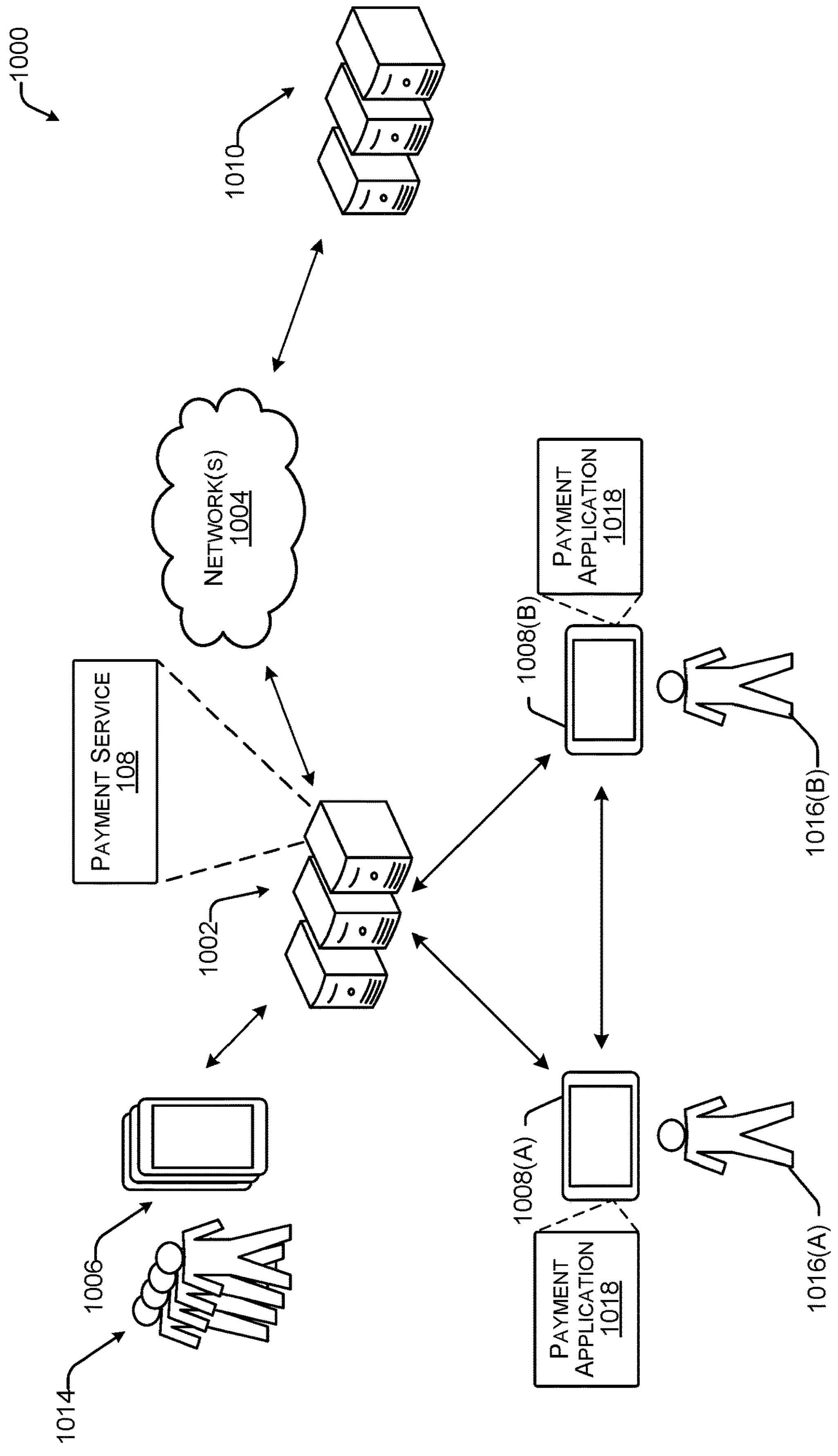
FIG. 10 is an example environment for performing techniques described herein.

FIG. 10 is an example environment 1000 for performing techniques described herein. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

For example, the server(s) 1002 may be the same as or similar to the payment service computing platform 112 and/or the processing device(s) 118 (e.g., server(s)) introduced in FIG. 1, and the server(s) 1002 may implement the payment service 108, which may include the search service 132 including the trained machine learning model(s) 134, the risk component 136, and/or the personalization component 138, as described herein. Furthermore, the network(s) 1004 may be the same as or similar to the network(s) 116 introduced in FIG. 1.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user devices 1006 (and in some examples, the user devices 1008) may be the same as or similar to the electronic devices 104 introduced in FIG. 1. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee. The users 1014 (and in some examples, the users 1016) may be the same as or similar to the users 102 introduced in FIG. 1, and the payment application 1018 may be the same as or similar to the payment application 106 introduced in FIG. 1.

In accordance with the examples described herein, the server(s) 1002 may use transaction data 128, 130 to rank search results. For instance, the server(s) 1002 may receive transaction data 128, 130 associated with users 1014, 1016 of a payment service 108, and may receive a search query 126 from a payment application 1018 associated with the payment service 108 and executing on a device 1006, 1008 of a user 1014, 1016. The server(s) 1002 may then generate a list of entities based at least in part on a likelihood, determined using a portion of the transaction data 128, 130 associated with the entities, that the user 1014, 1016 will be able to successfully complete a transaction in association with the entities, and may cause a user interface 122 of the payment application 1018 to present at least a portion of the list of entities as a search result 124 to the search query 126. In this example, the entities in the list generated by the server(s) 1002 may include merchants 110, 916.

Figure 11:
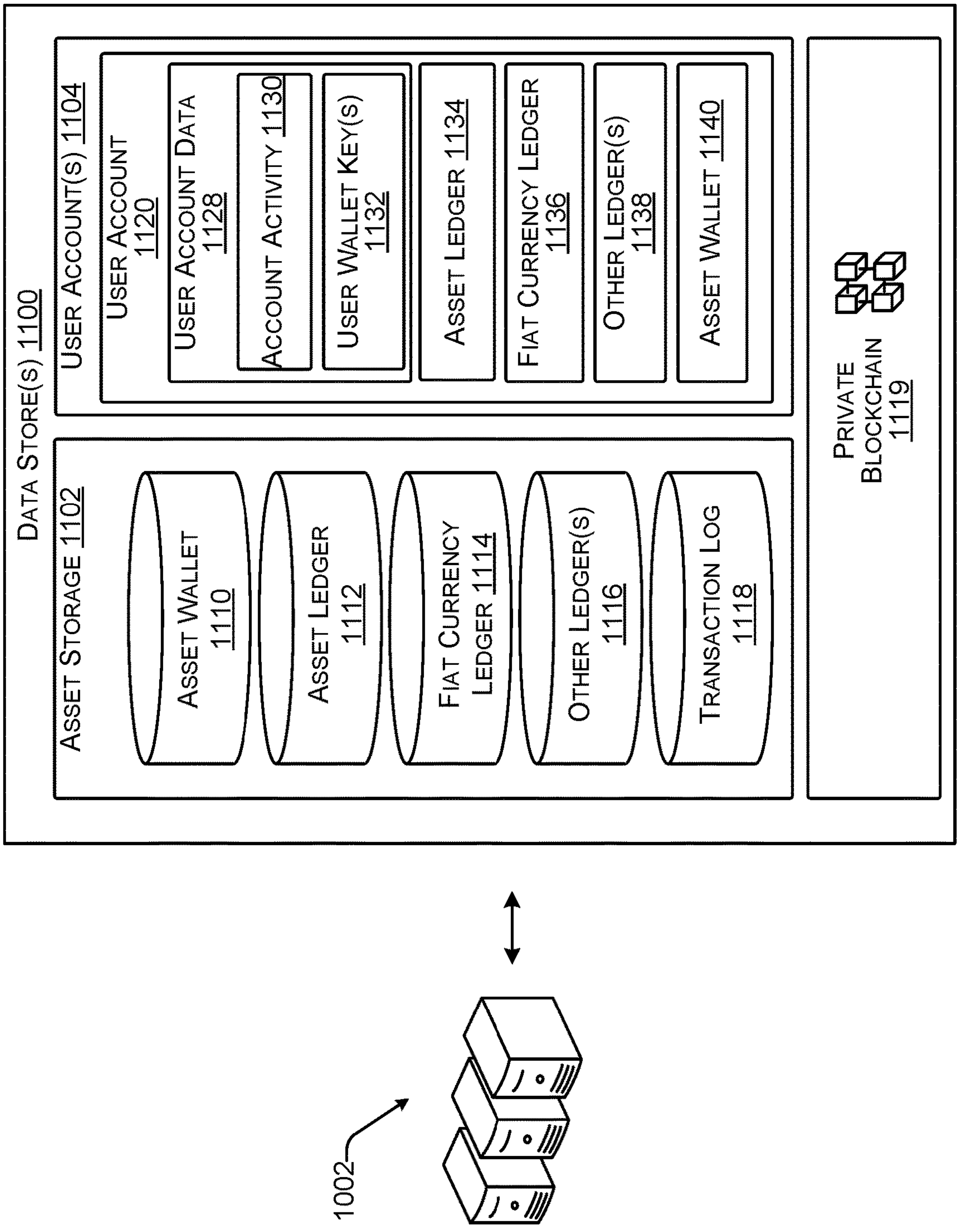
FIG. 11 is an example data store used for performing techniques described herein.

In some examples, the service provider can utilize a ledger system to track transfers of assets between users 1014, 1016. FIG. 11, below, provides additional details associated with such a ledger system. The ledger system can enable users 1014, 1016 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 10 or a third-party service provider associated with the server(s) 1010. In examples where the content provider is a third-party service provider, the server(s) 1010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1014, 1016 to transfer fiat currency, non-fiat currency, cryptocurrency, securities, or other assets, or portions thereof, to other users 1014, 1016. In at least one example, individual users can be associated with user accounts. Additional details associated with user accounts and the transfer of assets between users 1014, 1016 are described below with reference to FIG. 11.

Furthermore, the service provider of FIG. 10 can enable users 1014, 1016 to perform banking transactions via instances of the payment application 1018. For example, users can configure direct deposits or other deposits for adding assets to their various ledgers/balances. Further, users 1014, 1016 can configure bill pay, recurring payments, and/or the like using assets associated with their accounts. In addition to sending and/or receiving assets via peer-to-peer transactions, users 1014, 1016 buy and/or sell assets via asset networks such as cryptocurrency networks, securities networks, and/or the like.

FIG. 11 is an example data store 1100 used for performing techniques described herein. The data store(s) 1100 can be associated with the server(s) 1002. The data store(s) 1100 may be the same as or similar to the data store(s) 120 introduced in FIG. 1.

In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider of FIG. 10. In at least one example, the asset storage 1102 can be used to record whether individual of the assets are registered to users. For example, the asset storage 1102 can include an asset wallet 1110 for storing records of assets owned by the service provider of FIG. 10, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1014, 1016. Specifically, the asset storage 1102 may include asset ledger 1110, fiat currency ledger 1114, and other ledger(s) 1116, which can be used to record transfers of assets between users 1014, 1016 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based at least in part on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108.

In at least one example, the user account(s) 1104 may store records of user accounts associated with the users 1014. In at least one example, the user account(s) 1104 can include a user account 1120, which can be associated with a user (of the users 1014). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG. 10 using a value of fiat currency reflected in fiat currency ledger, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can require the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source (e.g., associated with the third-party server(s) 118). In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. 10 recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset ledger 1110, which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider of FIG. 10. In at least one example, individual of the accounts can be associated with a wallet or a stored balance for use in payment transactions, peer-to-peer transactions, payroll payments, etc.

In at least one example, the user account 1120 can be associated with an asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account 1130 can be funded by a balance transfer from a third-party cryptocurrency wallet, as described above. Such a transaction can require a user to transfer an amount of cryptocurrency in a message signed by the user's private key to an address of the cryptocurrency wallet account 1130. The transferred amount of cryptocurrency can then be within the cryptocurrency wallet account 1130 for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 10 is an aspect of the technology disclosed that enables technical advantages of increased processing speed and improved security.

Figure 12:
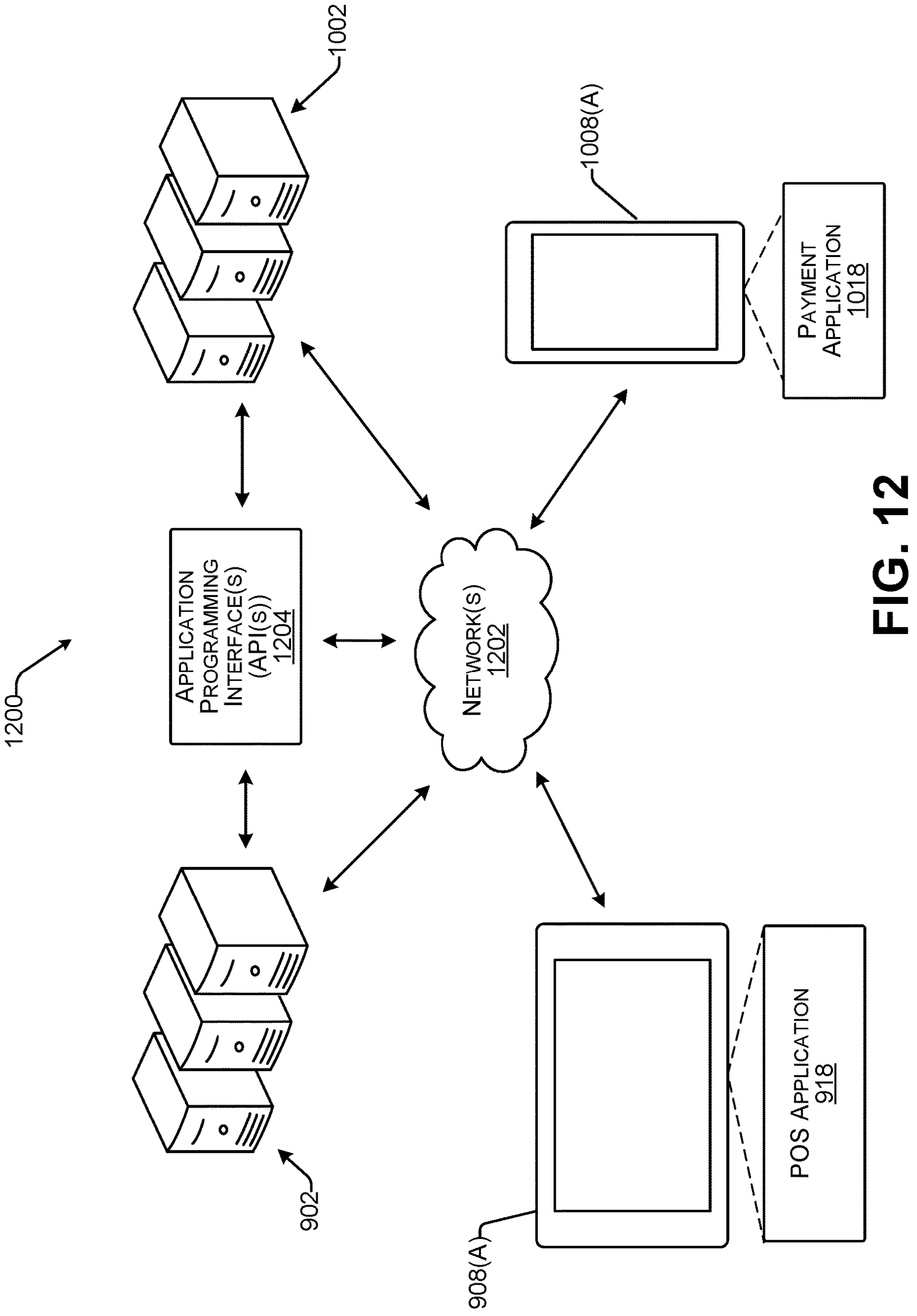
FIG. 12 is an example environment for performing techniques described herein.

FIG. 12 is an example environment 1200 for performing techniques described herein. In the environment 1200, the environment 1200 and the environment 1000 can be integrated to enable payments at the point-of-sale using assets associated with user accounts in the peer-to-peer environment of FIG. 10. As illustrated, each of the components can communicate with one another via one or more networks 1202. In some examples, one or more APIs 1204 or other functional components can be used to facilitate such communication.

In at least one example, the example environment 1200 can enable contactless payments, via integration of peer-to-peer payment, or other payment making, platform(s) and payment processing platform(s), are described herein. For the purpose of FIG. 12, the environment 1200 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 1208(A). In such an example, the POS application 1218, associated with a payment processing platform and executable by the merchant device 1208(A) of the merchant, can present a QR code, or other code that can be used to identify a transaction (e.g., a transaction code), in association with a transaction between the customer and the merchant. The QR code, or other transaction code, can be provided to the POS application 1218 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 1202 and/or server(s) 1002.

Based at least in part on the integration of the peer-to-peer payment platform and the payment processing platform (e.g., via the API), the server(s) 1202 and/or 1002 associated with each can exchange communications with each other—and with a payment application 1018 associated with the peer-to-peer payment platform and/or the POS application 1218—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1218 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A), In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1208(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1218 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving finds from the peer-to-peer payment platform.

As described above, techniques described herein offer improvements to conventional payment technologies. In an example, techniques described herein can enable transaction data to be sent from a POS application 1218 of a merchant device 1208(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 1218 on the merchant device 1208(A) of the merchant—the customer can see the item in their virtual cart on their own computing device in near-real time. In another example, the peer-to-peer payment platform can analyze transaction data as it is received to determine whether an incentive (e.g., a discount, a loyally reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed anchor maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a “peer” to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via, an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable con tactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1218, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 13:
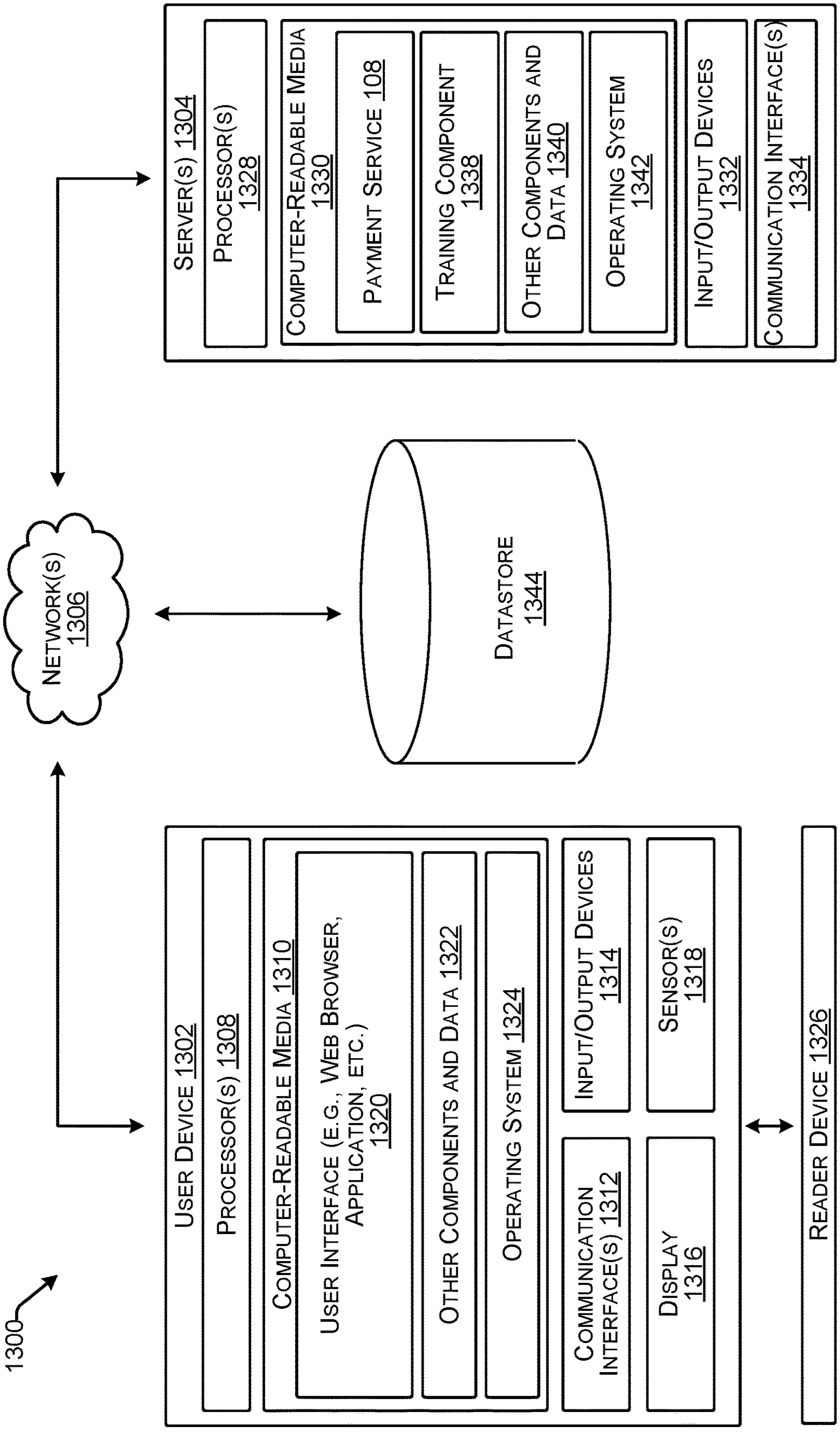
FIG. 13 is an example block diagram illustrating a system for performing techniques described herein.

FIG. 13 is an example block diagram 1300 illustrating a system for performing techniques described herein. The block diagram 1300 illustrates a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 12.

For example, the server(s) 1304 may be the same as or similar to the payment service computing platform 112 and/or the processing device(s) 118 (e.g., server(s)) introduced in FIG. 1, and the server(s) 1304 may implement the payment service 108, which may include the search service 132 including the trained machine learning model(s) 134, the risk component 136, and/or the personalization component 138, as described herein. Furthermore, the network(s) 1306 may be the same as or similar to the network(s) 116 introduced in FIG. 1, and the user device 1302 may be the same as or similar to the electronic device 104 introduced in FIG. 1.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, or the like. In other examples, the user interface 1320 can be presented via an application, such as a mobile application or desktop application, which can be provided by a service provider associated with the server(s) 1304, or which can be an otherwise dedicated application. In some examples, the user interface 1320 can be any of the user interfaces 118, 400, and/or 402 described herein. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, hapticly, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 612, described above, to provide one or more services. That is, in some examples, the service provider 612 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 614 and/or for sending users 614 notifications regarding available appointments with merchant(s) located proximate to the users 614. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the payment service system 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1312, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 612 and/or payment processing service. Functional components stored in the computer-readable media 1330 can optionally include a payment service 108 (including the sub-components 132, 136 and/or 138, and/or the trained machine learning model 134 depicted in FIG. 1), a training component 1338, and one or more other components and data 1340.

The training component 1338 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other components and data 1340 can include the sub-components of the payment service 108, the functionality of which is described, at least partially, above. Further, the one or more other components and data 1340 can include a merchant component configured to receive transaction data from POS systems, such as the POS system 1224 described above with reference to FIG. 12. Such a merchant component can transmit requests (e.g., authorization, capture, settlement, etc.) to payment service server computing device(s) to facilitate POS transactions between merchants and customers. Such a merchant component can communicate the successes or failures of the POS transactions to the POS systems. Further, the one or more other components and data 1340 can include programs, drivers, etc., and the data used or generated by the functional components. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1302 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. The data store 1344 may be the same as or similar to the data store(s) 120 introduced in FIG. 1. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the merchant profiles and/or customer profiles described above.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

Moreover, the methods can be combined in whole or in part with each other or with other methods.

What is claimed is:

1. A computer-implemented method comprising:

receiving, by a payment service computing platform, payment data associated with users of a payment service;

receiving, by the payment service computing platform, a search query from a payment application associated with the payment service and executing on a device of a user;

accessing, by the payment service computing platform, a first portion of the payment data associated with the user;

generating, by the payment service computing platform and using at least one machine-trained model to analyze the first portion of the payment data associated with the user, a personalized list of merchants, wherein merchants in the personalized list are ranked based at least in part on a likelihood, determined using a second portion of the payment data associated with the merchants, that the user will be able to successfully complete a transaction with the merchants; and causing, by the payment service computing platform, a user interface of the payment application to present at least a portion of the personalized list of merchants as a search result to the search query.

2. The computer-implemented method of claim 1, further comprising:

determining, by the payment service computing platform, and using the at least one machine-trained model to analyze the first portion of the payment data, a user risk metric associated with the user, wherein the personalized list of merchants is further generated based at least in part on the user risk metric.

3. The computer-implemented method of claim 2, further comprising:

determining, by the payment service computing platform, that the user risk metric satisfies a first threshold indicating that the user is a high risk user, wherein the merchants in the personalized list are associated with merchant risk metrics that do not satisfy a second threshold indicating that the merchants are low risk merchants.

4. The computer-implemented method of claim 3, further comprising:

receiving, by the payment service computing platform, a first indication of a selection of a merchant in the personalized list;

causing, by the payment service computing platform, and based on the user risk metric satisfying the first threshold, a second user interface of the payment application to display a subset of available payment options for purchasing an item from the merchant, wherein the subset is determined from a full set of payment options based at least in part on the user risk metric;

receiving, by the payment service computing platform, a second indication of a selection of a payment option of the subset of available payment options; and completing, by the payment service computing platform, a transaction for the item using the payment option.

5. A system comprising:

one or more processors; and computer-executable instructions that, when executed by the one or more processors, cause the one or more processors to perform operations comprising:

receiving transaction data associated with users of a payment service;

receiving a search query from a payment application associated with the payment service and executing on a device of a user;

generating a list of entities based at least in part on a likelihood, determined using a portion of the transaction data associated with the entities, that the user will be able to successfully complete a transaction in association with the entities; and causing a user interface of the payment application to present at least a portion of the list of entities as a search result to the search query.

6. The system of claim 5, wherein the portion of the transaction data is a second portion of the transaction data, the operations further comprising:

determining, based at least in part on a first portion of the transaction data associated with the user, a user risk metric associated with the user, wherein the list of entities is further generated based at least in part on the user risk metric.

7. The system of claim 6, the operations further comprising:

determining that the user risk metric satisfies a first threshold indicating that the user is a high risk user, wherein the entities in the list are associated with entity risk metrics that do not satisfy a second threshold indicating that the entities are low risk entities.

8. The system of claim 6, the operations further comprising:

determining that the user risk metric does not satisfy a first threshold indicating that the user is a low risk user, wherein the entities in the list include entities associated with entity risk metrics that satisfy a second threshold indicating that the entities are high risk entities.

9. The system of claim 6, wherein the user risk metric is determined using at least one machine-trained model trained using at least some of the transaction data and at least one of:

user interaction data associated with the user, the user interaction data indicating interactions of the user with other users of the payment service;

third party data associated with the user, the third party data having been received from one or more external services;

tenure data associated with the user, the tenure data indicating a length of time the user has been a registered user of the payment service;

demographic data associated with the user;

contact data associated with the user;

behavioral data associated with the user;

financial data associated with the user; or user preference data associated with the user.

10. The system of claim 6, wherein the user risk metric is determined prior to the receiving of the search query.

11. The system of claim 6, the operations further comprising:

receiving a first indication of a selection of an entity in the list;

causing, based on at least one of the user risk metric or an entity risk metric associated with the entity, a second user interface of the payment application to display a subset of available payment options for purchasing an item from the entity, wherein the subset is determined from a full set of payment options based at least in part on the user risk metric;

receiving a second indication of a selection of a payment option of the subset of available payment options; and completing a transaction for the item using the payment option.

12. The system of claim 5, the operations further comprising:

accessing user data associated with the user; and ranking the entities in the list to generate a personalized list of entities, wherein the ranking uses at least one machine-trained model to analyze the user data, wherein the causing of the user interface to present at least the portion of the list of entities comprises causing the user interface to present at least the portion of the personalized list of entities.

13. The system of claim 12, wherein at least some of the entities in the list are merchants, the operations further comprising:

accessing merchant data associated with the merchants, wherein the ranking of the entities in the list is further based at least in part on the merchant data.

14. The system of claim 5, the operations further comprising:

receiving updated transaction data associated with one or more of the entities in the list; and causing, based at least in part on the updated transaction data, the user interface of the payment application to modify at least the portion of the list of entities being presented as the search result.

15. A computer-implemented method comprising:

receiving, by a payment service computing platform, transaction data associated with users of a payment service;

receiving, by the payment service computing platform, a search query from a payment application associated with the payment service and executing on a device of a user;

generating, by the payment service computing platform, a list of entities based at least in part on a likelihood, determined using a portion of the transaction data associated with the entities, that the user will be able to successfully complete a transaction in association with the entities; and causing, by the payment service computing platform, a user interface of the payment application to present at least a portion of the list of entities as a search result to the search query.

16. The computer-implemented method of claim 15, wherein the portion of the transaction data is a second portion of the transaction data, the computer-implemented method further comprising:

determining, by the payment service computing platform, and based at least in part on a first portion of the transaction data associated with the user, a user risk metric associated with the user, wherein the list of entities is further generated based at least in part on the user risk metric.

17. The computer-implemented method of claim 16, further comprising:

determining, by the payment service computing platform, that the user risk metric satisfies a first threshold indicating that the user is at least one of a medium risk user or a high risk user; and at least one of:

allowing, by the payment service computing platform, the user to conduct a number of transactions or a frequency of transactions that does not exceed a particular number of transactions or a particular frequency of transactions with one or more entities in the list that are associated with entity risk metrics that satisfy a second threshold; or allowing, by the payment service computing platform, the user to conduct transactions with the one or more entities at a transaction amount that does not exceed a particular transaction amount.

18. The computer-implemented method of claim 16, further comprising:

receiving, by the payment service computing platform, updated transaction data associated with the user, wherein the user risk metric is determined using at least one machine-trained model in response to the receiving of the updated transaction data.

19. The computer-implemented method of claim 16, further comprising:

receiving, by the payment service computing platform, a first indication of a selection of an entity in the list;

causing, by the payment service computing platform, and based on at least one of the user risk metric or an entity risk metric associated with the entity, a second user interface of the payment application to display a subset of available payment options for purchasing an item from the entity, wherein the subset is determined from a full set of payment options based at least in part on the user risk metric;

receiving, by the payment service computing platform, a second indication of a selection of a payment option of the subset of available payment options; and completing, by the payment service computing platform, a transaction for the item using the payment option.

20. The computer-implemented method of claim 15, wherein the entities in the list are ranked based at least in part on the likelihood that the user will be able to successfully complete the transaction in association with the entities, and wherein the entities comprise one or more of a merchant, another user, a group of users, an item, or an incentive.

* * * * *